United States Patent
Ni et al.

(10) Patent No.: US 7,675,514 B2
(45) Date of Patent: Mar. 9, 2010

(54) THREE-DIMENSIONAL OBJECT DISPLAY APPARATUS, THREE-DIMENSIONAL OBJECT SWITCHING DISPLAY METHOD, THREE-DIMENSIONAL OBJECT DISPLAY PROGRAM AND GRAPHICAL USER INTERFACE

(75) Inventors: Meng Ni, Tokyo (JP); Hiromitsu Oka, Tokyo (JP)

(73) Assignee: Sony Corporation, Tokyo (JP)

( * ) Notice: Subject to any disclaimer, the term of this patent is extended or adjusted under 35 U.S.C. 154(b) by 683 days.

(21) Appl. No.: 11/446,383

(22) Filed: Jun. 5, 2006

(65) Prior Publication Data

US 2006/0274060 A1   Dec. 7, 2006

(30) Foreign Application Priority Data

Jun. 6, 2005   (JP)   ............................. 2005-165600

(51) Int. Cl.
*G06T 15/00*   (2006.01)
(52) U.S. Cl. ....................... 345/419; 345/421; 345/422; 345/423; 345/443; 348/135; 382/154; 382/224
(58) Field of Classification Search ................. 345/419, 345/421, 422, 423, 443; 382/154, 224; 348/135
See application file for complete search history.

(56) References Cited

U.S. PATENT DOCUMENTS 6,466,237 B1 * 10/2002 Miyao et al. ................ 715/838

7,437,005 B2 * 10/2008 Drucker et al. .............. 382/224
2006/0212833 A1 * 9/2006 Gallagher et al. ........... 715/848

FOREIGN PATENT DOCUMENTS

| JP | 6-180661 | 6/1994 |
|---|---|---|
| JP | 7-114451 | 5/1995 |
| JP | 9-259130 | 10/1997 |
| JP | 10-307936 | 11/1998 |
| JP | 11-194864 | 7/1999 |
| JP | 11-231993 | 8/1999 |
| JP | 2000-305760 | 11/2000 |
| JP | 2002-163103 | 6/2002 |
| JP | 2003-303333 | 10/2003 |
| JP | 2005-33711 | 2/2005 |
| JP | 2005-55743 | 3/2005 |
| WO | WO 00/33572 | 6/2000 |

* cited by examiner

*Primary Examiner*—Kimbinh T Nguyen
(74) *Attorney, Agent, or Firm*—Oblon, Spivak, McClelland, Maier & Neustadt, L.L.P.

(57) ABSTRACT

A three-dimensional object display apparatus includes a three-dimensional object generation section that generates a three-dimensional object by laying out a plurality of image data to surfaces of a solid. The three-dimensional object is made in a three-dimensional shape to be displayed on a display section. The three-dimensional object display apparatus also includes a selection operation section that enables a user to select a manner of presenting the plurality of image data to the user on the display section. The three-dimensional object display apparatus further includes a control section that switches, in response to the manner selected by the user, the three-dimensional shape of the three-dimensional object.

12 Claims, 25 Drawing Sheets

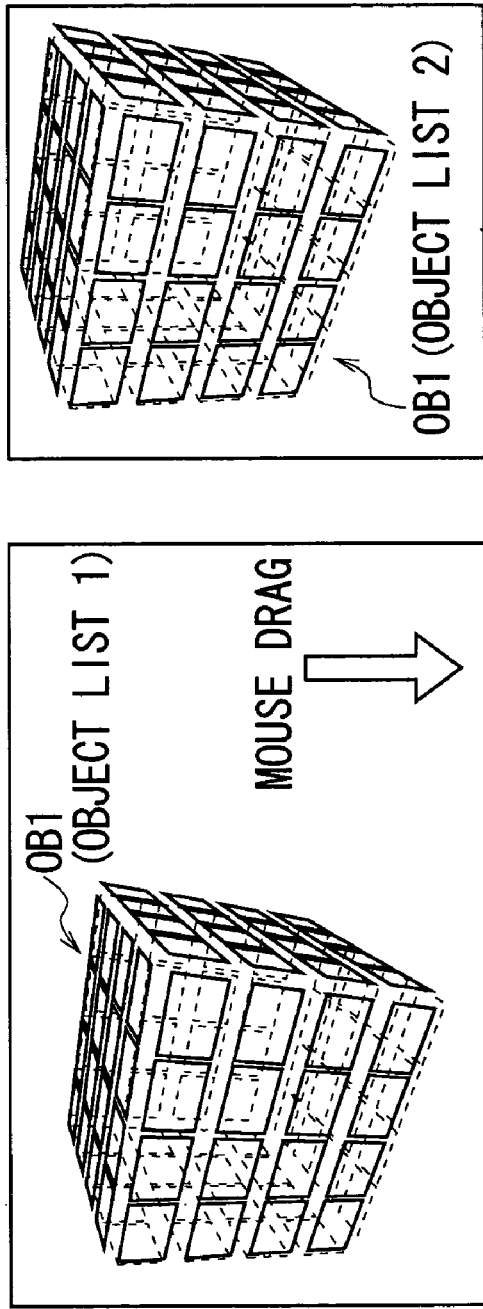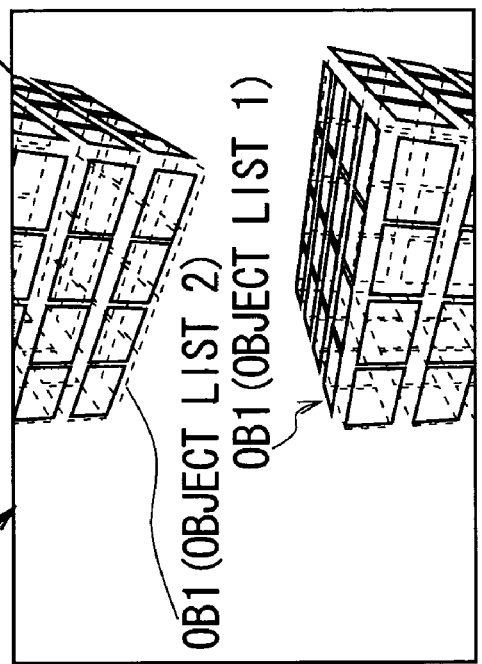

THREE-DIMENSIONAL OBJECT DISPLAY APPARATUS, THREE-DIMENSIONAL OBJECT SWITCHING DISPLAY METHOD, THREE-DIMENSIONAL OBJECT DISPLAY PROGRAM AND GRAPHICAL USER INTERFACE

CROSS REFERENCES TO RELATED APPLICATIONS

The present invention contains subject matter related to Japanese Patent Application JP2005-165600 filed in the Japanese Patent Office on Jun. 6, 2005, the entire contents of which being incorporated herein by reference.

BACKGROUND OF THE INVENTION

1. Field of the Invention

The present invention relates to a three-dimensional object display apparatus, three-dimensional object switching display method, three-dimensional object display program and graphical user interface, and, for example, is preferably utilized to display a plurality of thumbnail images, which are equivalent to a plurality of multimedia files (moving picture files, for example), in an easy-to-see manner to users.

2. Description of Related Art

Multimedia file browsers, such as "iPhoto (Apple Computer, Inc.)," "ACDSee (ACD Systems)," and "Picasa (Google)", have a display mode switching function to sort a lot of photos and multimedia files by category or by date and time and then to display them.

Those multimedia file browsers place a plurality of thumbnail images side-by-side on a two-dimensional surface. Accordingly, the number of thumbnail images to be displayed is dependent upon the size of the two-dimensional surface. Therefore, it is physically difficult to place all the thumbnail images in one screen.

One way to deal with that is to use a three-dimensional figure such as a polygonal column. In this case, images are laid out to each side of the polygonal column which then rotates around a central axis on a display (see Jpn. Pat. Appln. Laid-open Publication No. 2002-82745, for example).

SUMMARY OF THE INVENTION

By the way, using an information processing device that displays the rotatable polygonal column whose side faces present images may not provide a visually easy-to-see graphical user interface, because this kind of information processing device does not change its display format even when a user wants to sort the displayed thumbnail images by category or by date and time.

The present invention has been made in view of the above points and is intended to provide a three-dimensional object display apparatus, three-dimensional object switching display method, three-dimensional object display program and graphical user interface capable of displaying image data in a visually easy-to-see manner to users.

In an embodiment of the present invention, a three-dimensional object display apparatus includes: three-dimensional object generation means for generating a three-dimensional object by laying out a plurality of image data to surfaces of a solid, the three-dimensional object being made in a three-dimensional shape to be displayed on a display section; selection operation means for a user to select a manner of presenting the plurality of image data to the user on the display section; and control means for switching, in response to the manner selected by the user, the three-dimensional shape of the three-dimensional object.

In this manner, the three-dimensional object display apparatus switches the three-dimensional object to a certain three-dimensional shape in accordance with the manner desired by the user, and presents the plurality of image data laid out to the surfaces of the three-dimensional object switched. Therefore, the three-dimensional object display apparatus can display the image data in a visually easy-to-see manner to users.

In addition, in an embodiment of the present invention, a three-dimensional object switching display method includes: a three-dimensional object generation step of generating a three-dimensional object by laying out a plurality of image data to surfaces of a solid, the three-dimensional object being made in a three-dimensional shape to be displayed on a display section; a presentation manner selection step of enabling a user to select a manner of presenting the plurality of image data to the user on the display section; and a shape switching step of switching, in response to the manner selected by the user, the three-dimensional shape of the three-dimensional object.

In this manner, the three-dimensional object switching display method switches the three-dimensional object to a certain three-dimensional shape in accordance with the manner desired by the user, and presents the plurality of image data laid out to the surfaces of the three-dimensional object switched. Therefore, the three-dimensional object switching display method can display the image data in a visually easy-to-see manner to users.

Furthermore, in an embodiment of the present invention, a three-dimensional object display program causes an information processing apparatus to execute: a three-dimensional object generation step of generating a three-dimensional object by laying out a plurality of image data to surfaces of a solid, the three-dimensional object being made in a three-dimensional shape to be displayed on a display section; a presentation manner selection step of enabling a user to select a manner of presenting the plurality of image data to the user on the display section; and a shape switching step of switching, in response to the manner selected by the user, the three-dimensional shape of the three-dimensional object.

In this manner, the three-dimensional object display program enables the information processing apparatus to switch the three-dimensional object to a certain three-dimensional shape in accordance with the manner desired by the user, and present the plurality of image data laid out to the surfaces of the three-dimensional object switched. Therefore, the three-dimensional object display program can display the image data in a visually easy-to-see manner to users.

Furthermore, in an embodiment of the present invention, a graphical user interface, which displays a three-dimensional object made in a three-dimensional shape and switches the shape of the three-dimensional object when needed, includes: a three-dimensional object display step of displaying on a display section the three-dimensional object generated by laying out a plurality of image data to surfaces of a solid; a presentation manner recognition step of enabling a user to select a manner of presenting the plurality of image data to the user on the display section, and then recognizing the selected manner; and a shape switching step of switching, in response to the manner selected, the three-dimensional shape of the three-dimensional object.

In this manner, the graphical user interface switches the three-dimensional object to a certain three-dimensional shape in accordance with the manner desired by the user, and presents the plurality of image data laid out to the surfaces of the three-dimensional object switched. Therefore, the graphical user interface can display the image data in a visually easy-to-see manner to users.

The three-dimensional object display apparatus, three-dimensional object switching display method and graphical user interface according to an embodiment of the present invention can switch the three-dimensional object to a certain three-dimensional shape in accordance with the manner desired by the user, and present the plurality of image data laid out to the surfaces of the three-dimensional object switched. Thus, the three-dimensional object display apparatus, three-dimensional object switching display method and graphical user interface can display the image data in a visually easy-to-see manner to users.

In addition, the three-dimensional object display program according to an embodiment of the present invention allows the information processing apparatus to switch the three-dimensional object to a certain three-dimensional shape in accordance with the manner desired by the user, and to present the plurality of image data laid out to the surfaces of the three-dimensional object switched. Thus, the three-dimensional object display program can display the image data in a visually easy-to-see manner to users.

The nature, principle and utility of the invention will become more apparent from the following detailed description when read in conjunction with the accompanying drawings in which like parts are designate by like reference numerals or characters.

BRIEF DESCRIPTION OF THE DRAWINGS

In the accompanying drawings:

FIGS. 11A to 11C are schematic diagrams illustrating addition and deletion of slide show list (2);

DETAILED DESCRIPTION OF PREFERRED EMBODIMENTS

An embodiment of the present invention will be described in detail with reference to the accompanying drawings.

(1) Concept of the Embodiment of the Present Invention

A three-dimensional multimedia browser according to an embodiment of the present invention lays out thumbnail images, which are equivalent to multimedia files such as still images, moving images and sound files, to each side of a three-dimensional figure such as a virtual polyhedron and a virtual polygonal column. In this case, the thumbnail images are equivalent to image data. By laying out the thumbnail images to the sides of the three-dimensional figure, the three-dimensional multimedia browser for example generates a cubic object and a cylindrical object.

In this case, a user selects one of two options: "Classification by Category" or "Order of Time". In response to that, the three-dimensional multimedia browser switches its display format from the cubic object to the cylindrical object, or from the cylindrical object to the cubic object, and at the same time the three-dimensional multimedia browser displays this scene. In this manner, the three-dimensional multimedia browser provides a graphical user interface by which a plurality of thumbnail images, which are laid out to the sides of the cubic object and cylindrical object, are displayed in a visually easy-to-see manner to users.

By the way, instead of the thumbnail images, icons and other images can be the image data laid out to the sides of the cubic object and cylindrical object. However, for ease of explanation, only the thumbnail images will be described as the image data.

Figure 1:
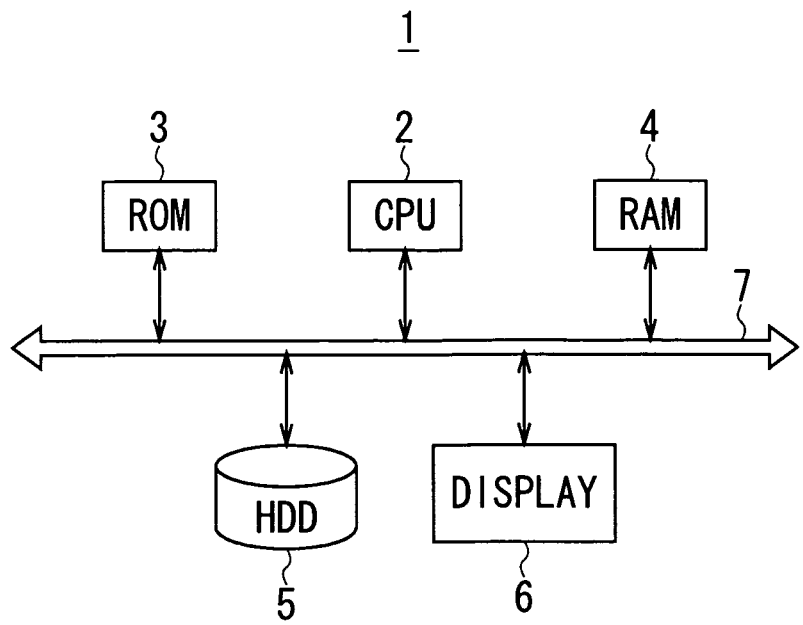
FIG. 1 is a schematic block diagram showing the hardware configuration of a personal computer.

(2) Configuration of Personal Computer with Three-dimensional Multimedia Browser In FIG. 1, the reference numeral 1 denotes a personal computer as a whole, which has hardware components capable of running a three-dimensional multimedia browser according to an embodiment of the present invention. The personal computer 1 has a Central Processing Unit (CPU) 2 to take overall control of the personal computer 1. The CPU 2 connects to a Read Only Memory (ROM) 3, a Random Access Memory (RAM) 4, a hard disk drive 5 and a display 6 (equivalent to a Liquid Crystal Display (LCD)) through a bus 7.

Especially, the personal computer 1 reads out various application programs such as a basic program and a three-dimensional object display program (described below) from a hard disk via the hard disk drive 5, and then loads these programs into the RAM 4 to run a three-dimensional multimedia browser. In this manner, the personal computer 1 performs various processes such as a procedure of a three-dimensional object display process (described below), and displays the results on the display 6.

(3) Configuration of Three-dimensional Multimedia Browser

Figure 2:
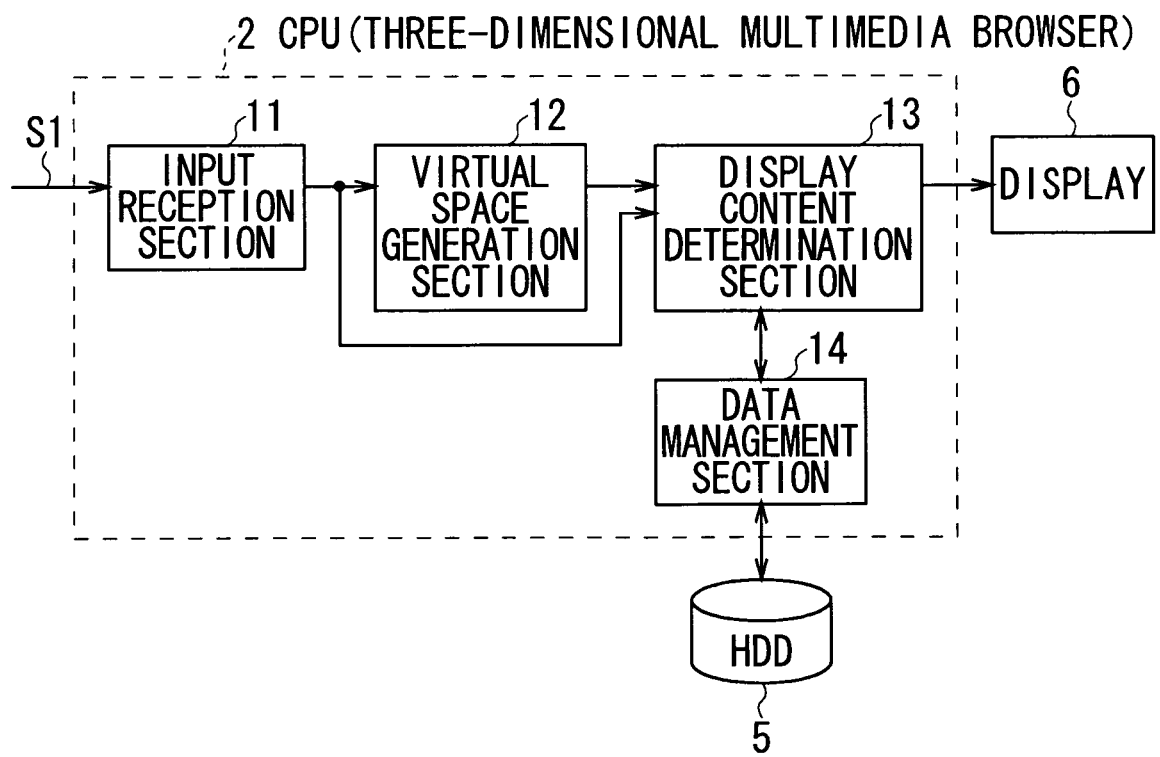
FIG. 2 is a schematic functional block diagram showing the software configuration of a three-dimensional multimedia browser.

With reference to FIG. 2, the configuration of the three-dimensional multimedia browser will be described below. The three-dimensional multimedia browser is one of functions the personal computer 1 has. To make the three-dimensional multimedia browser available, the CPU 2 of the personal computer 1 runs the three-dimensional object display program.

The three-dimensional multimedia browser is one of the functions the personal computer 1 has, which is made available by running the three-dimensional object display program by the CPU 2. This function is divided into a plurality of function blocks: an input reception section 11, a virtual space generation section 12, a display content determination section 13, a data management section 14 and the like. Each function block will be described in detail.

The three-dimensional multimedia browser utilizes the input reception section 11 to receive an input signal S1 input by a user through an input operation section (not shown) such as mouse, touch panel, keyboard and joystick, and then supply the input signal S1 to the virtual space generation section 12. In this case, the input signal S1 includes various kinds of information such as a coordinate value of a screen coordinate system of the display 6 and trigger information generated by a drag-and-drop operation.

Based on the trigger information of the input signal S1, the virtual space generation section 12 makes up a three-dimensional virtual space with X axis, Y axis and X axis, and manages spatial information about the three-dimensional virtual space. In addition, the virtual space generation section 12 performs various processes, such as generating a virtual polyhedron or a virtual polygonal column to lay out the plurality of thumbnail images, and converting the coordinate value of the input signal S1 into a spatial coordinate value of the three-dimensional virtual space.

Figure 3:
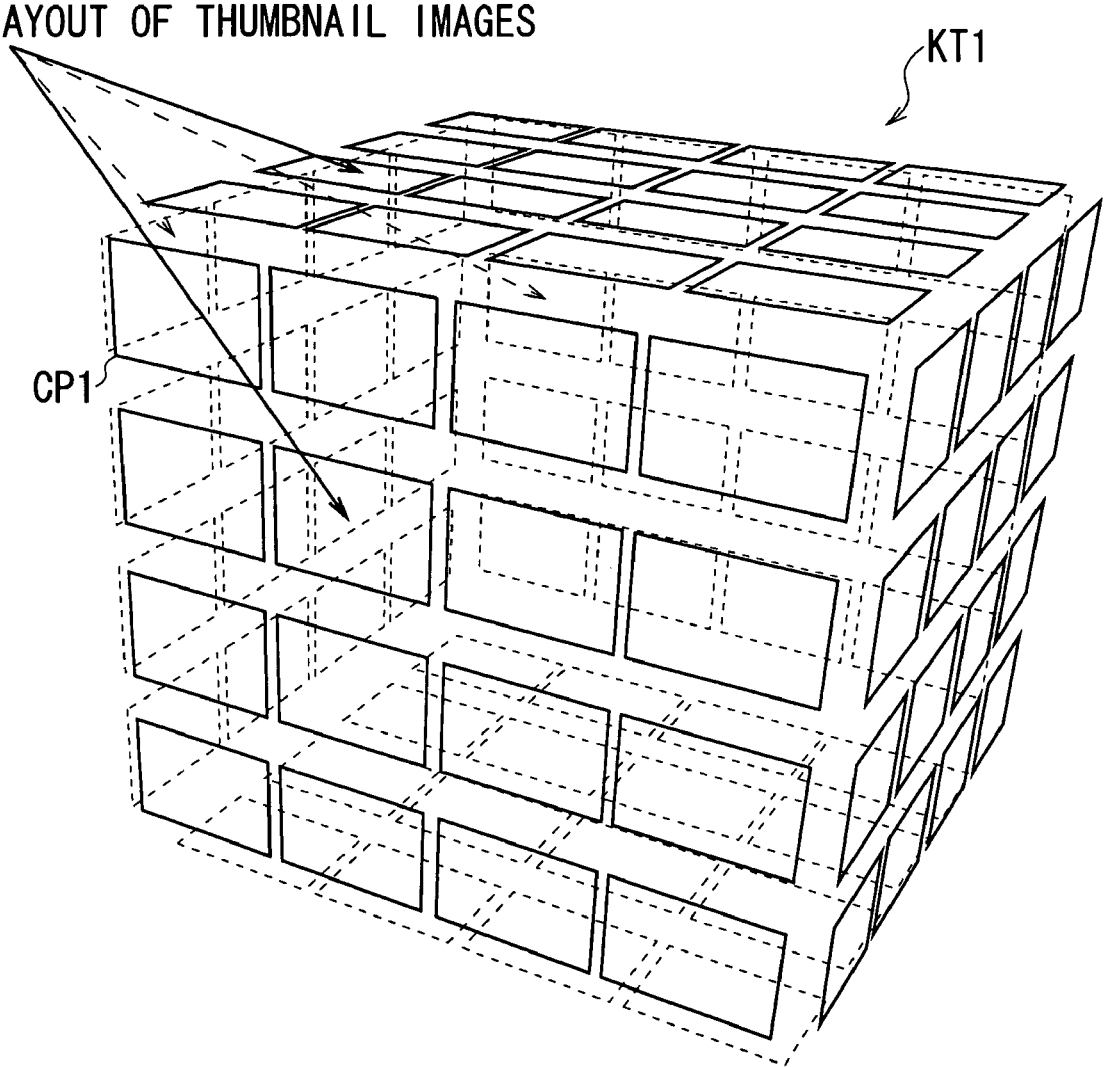
FIG. 3 is a schematic perspective view showing a virtual polyhedron on polyhedron mode.

Actually, the virtual space generation section 12 in polyhedron mode, as shown in FIG. 3, generates a virtual polyhedron KT1 for example equivalent to a cube (hexahedron). Each surface of the virtual polyhedron KT1 (i.e. each surface of the cube) has a plurality of rectangular-shaped layout areas CP1 on which the plurality of thumbnail images are displayed. In this case, each surface of the virtual polyhedron KT1 has sixteen layout areas CP1. The thumbnail images laid out to the sixteen layout areas CP1 are the same size.

In this virtual polyhedron KT1, the rectangular-shaped layout areas CP1 of each surface are visible. However, as a matter of fact, a user cannot visually check the rectangular-shaped layout areas CP1, because the layout areas CP1 are just specified by coordinate values of the three-dimensional virtual space. Therefore, with each surface of the virtual polyhedron KT1, the layout areas CP1 with no thumbnail images are transparent on the display 6.

In addition, on the virtual polyhedron KT1, the layout areas CP1 of each surface are not laid out to each other. The layout areas CP1 of each surface are evenly spaced apart from each other. Accordingly, there are open spaces between the layout areas CP1, and therefore a user can visually check the thumbnail images on the back and side surfaces through the open spaces.

Thus, with this virtual polyhedron KT1, it is possible for a user to visually check a plurality of thumbnail images on all surfaces (six surfaces) of the cube at once. This allows a user to intuitively recognize that there are a lot of thumbnails images, and to understand the contents of the thumbnail images on all six surfaces of the virtual polyhedron KT1, compared to the method in which thumbnail images are displayed on a two-dimensional surface.

Figure 4:
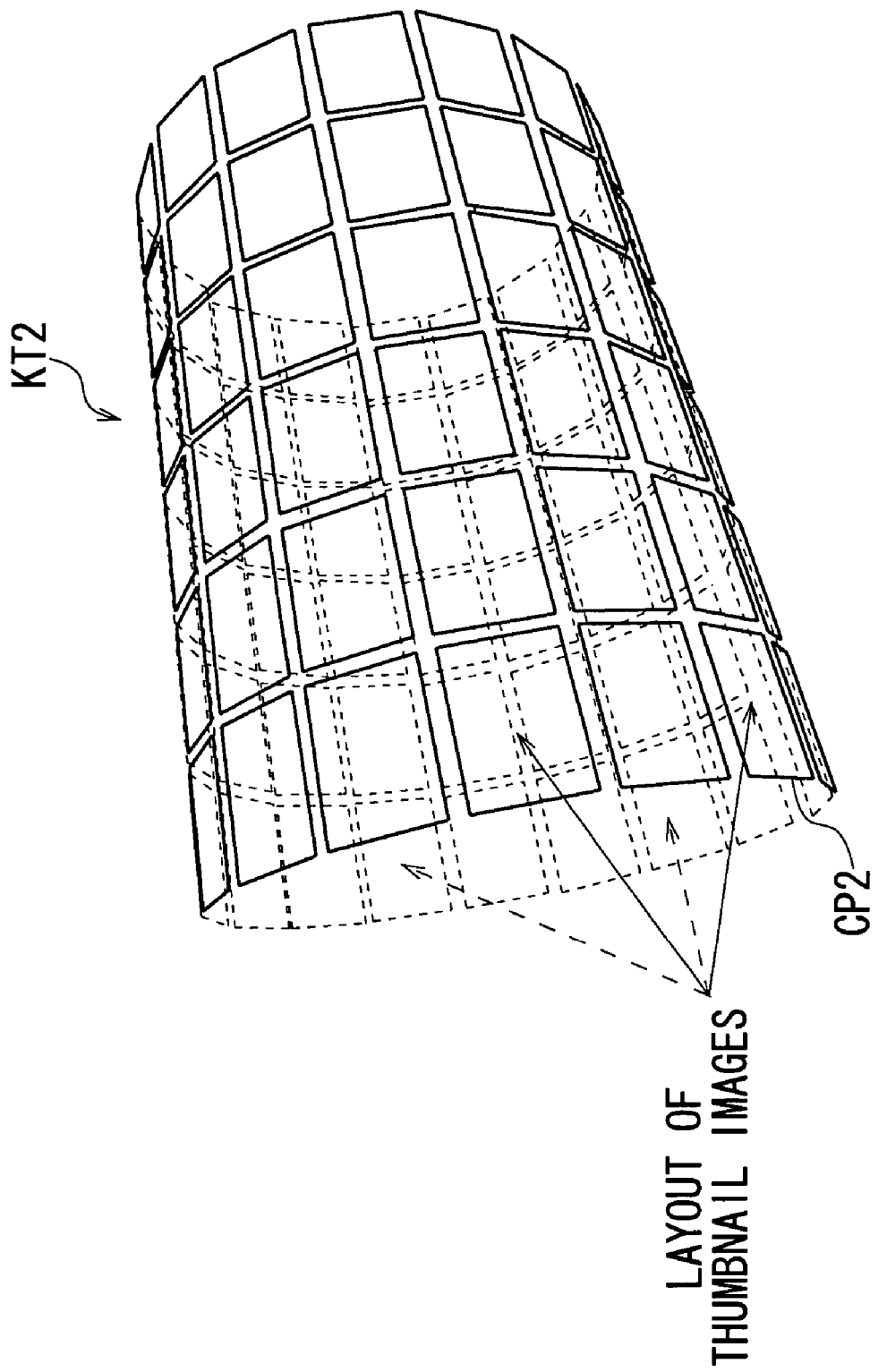
FIG. 4 is a schematic perspective view showing a virtual polygonal column on cylinder mode.

As shown in FIG. 4, for example, the virtual space generation section 12 in cylinder mode generates a virtual polygonal column KT2 with sixteen side surfaces, which is substantially in the shape of a circular cylinder. Each side surface of the virtual polygonal column KT2 has a plurality of layout areas CP2 on which the plurality of thumbnail images are displayed. In this case, each side surface of the virtual polygonal column KT2 has six layout areas CP2 in a line in a longitudinal direction. The thumbnail images are laid out to the six layout areas CP2 of each side surface.

In this virtual polygonal column KT2, the rectangular-shaped layout areas CP2 of each side surface are visible. However, as a matter of fact, a user cannot visually check the rectangular-shaped layout areas CP2, because the layout areas CP2 are just specified by coordinate values of the three-dimensional virtual space. Therefore, with each side surface of the virtual polygonal column KT2, the layout areas CP2 with no thumbnail images are transparent on the display 6.

In addition, on the virtual polygonal column KT2, the layout areas CP2 of each surface are not laid out to each other. The layout areas CP2 of each surface are evenly spaced apart from each other, in the same way as the virtual polyhedron KT1. Accordingly, there are open spaces between the layout areas CP2, and therefore a user can visually check the thumbnail images on the back and other side surfaces through the open spaces.

Thus, with this virtual polygonal column KT2, it is possible for a user to visually check a plurality of thumbnail images on all side surfaces (sixteen side surfaces) of the polygonal column at once. This allows a user to intuitively recognize that there are a lot of thumbnails images, and to understand the contents of the thumbnail images on all sixteen side surfaces of the virtual polygonal column KT2, compared to the method in which thumbnail images are displayed on a two-dimensional surface.

After that, based on the input signal S1 supplied from the input reception section 11, the display content determination section 13 reads out multimedia files (such as still images, moving images and sound files), which are managed by the data management section 14, from the hard disk drive 5, and then classifies or sorts the multimedia files to determine which thumbnail images of the multimedia files are laid out to which sides of the virtual polyhedron KT1 (FIG. 3) and virtual polygonal column KT2 (FIG. 4).

In this case, as the classification process for the multimedia files, the display content determination section 13 classifies the multimedia files in dependence upon the option ("Shooting Location," for example) selected by a user or selected automatically.

When the selected option is a "Shooting Location," the display content determination section 13 reads out attribute information of the multimedia files (such as shooting locations, shooting date and time, and resolution), which is managed by the data management section 14. Based on the attribute information, the display content determination section 13 then classifies the multimedia files by shooting location (such as "Japan," "Africa," "Australia," and the like), and categorizes the surfaces of the virtual polyhedron KT1 by shooting location (such as "Japan," "Africa," "Australia," and the like) to determine layout locations of the thumbnail images.

On the other hand, as the sorting process for the multimedia files, the display content determination section 13 sorts the multimedia files in dependence upon the option ("Shooting Date and Time," for example) selected by a user or selected automatically.

When the selected option is a "Shooting Date and Time," the display content determination section 13 reads out the attribute information of the multimedia files, which is managed by the data management section 14. Based on the attribute information, the display content determination section 13 then sorts the multimedia files in order of shooting date and time, and allocates the surfaces of the virtual polygonal column KT2 in order of shooting date and time to determine layout locations of the thumbnail images.

Figure 5:
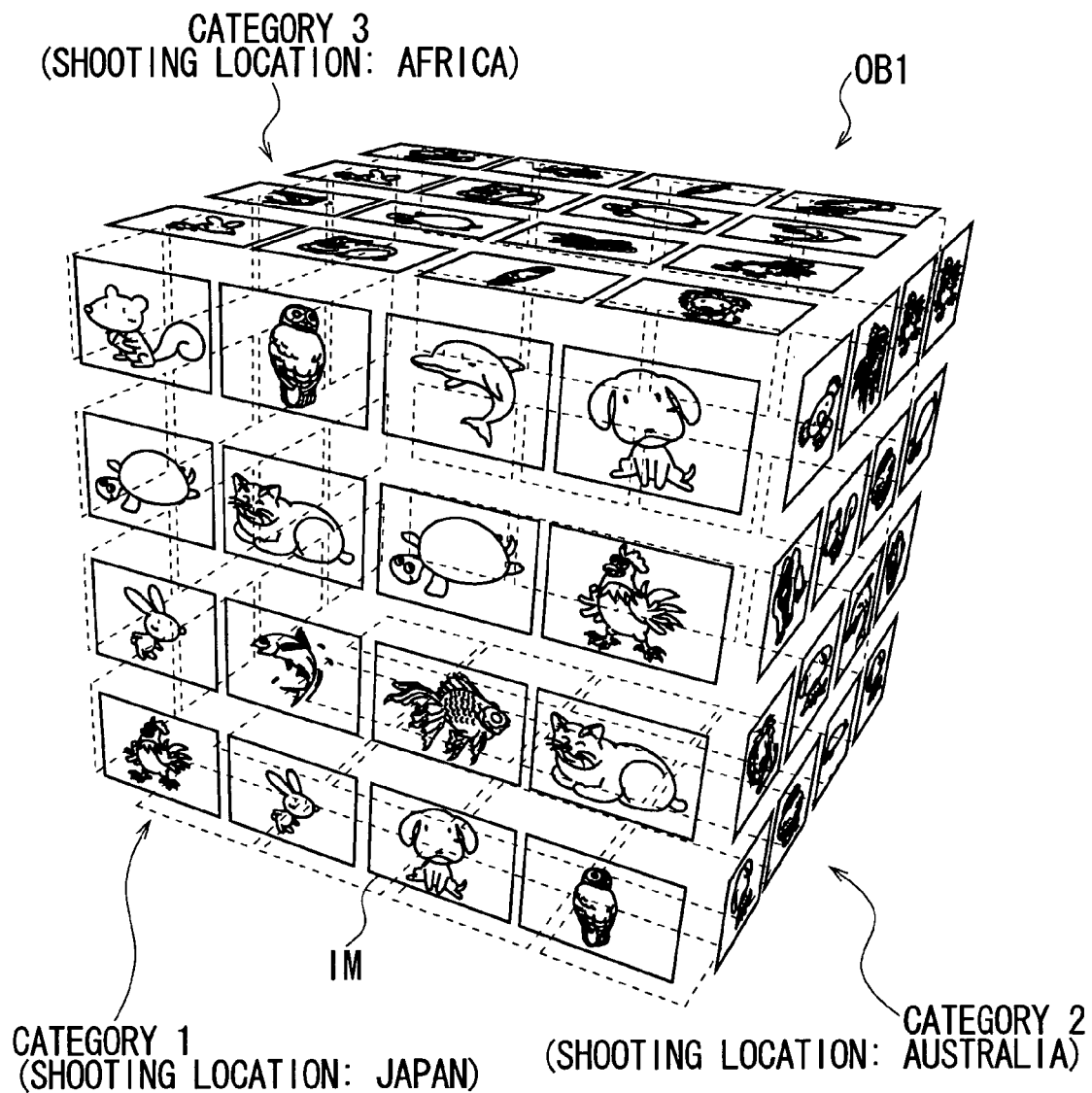
FIG. 5 is a schematic perspective view showing a cubic object classified by category.
Figure 6:
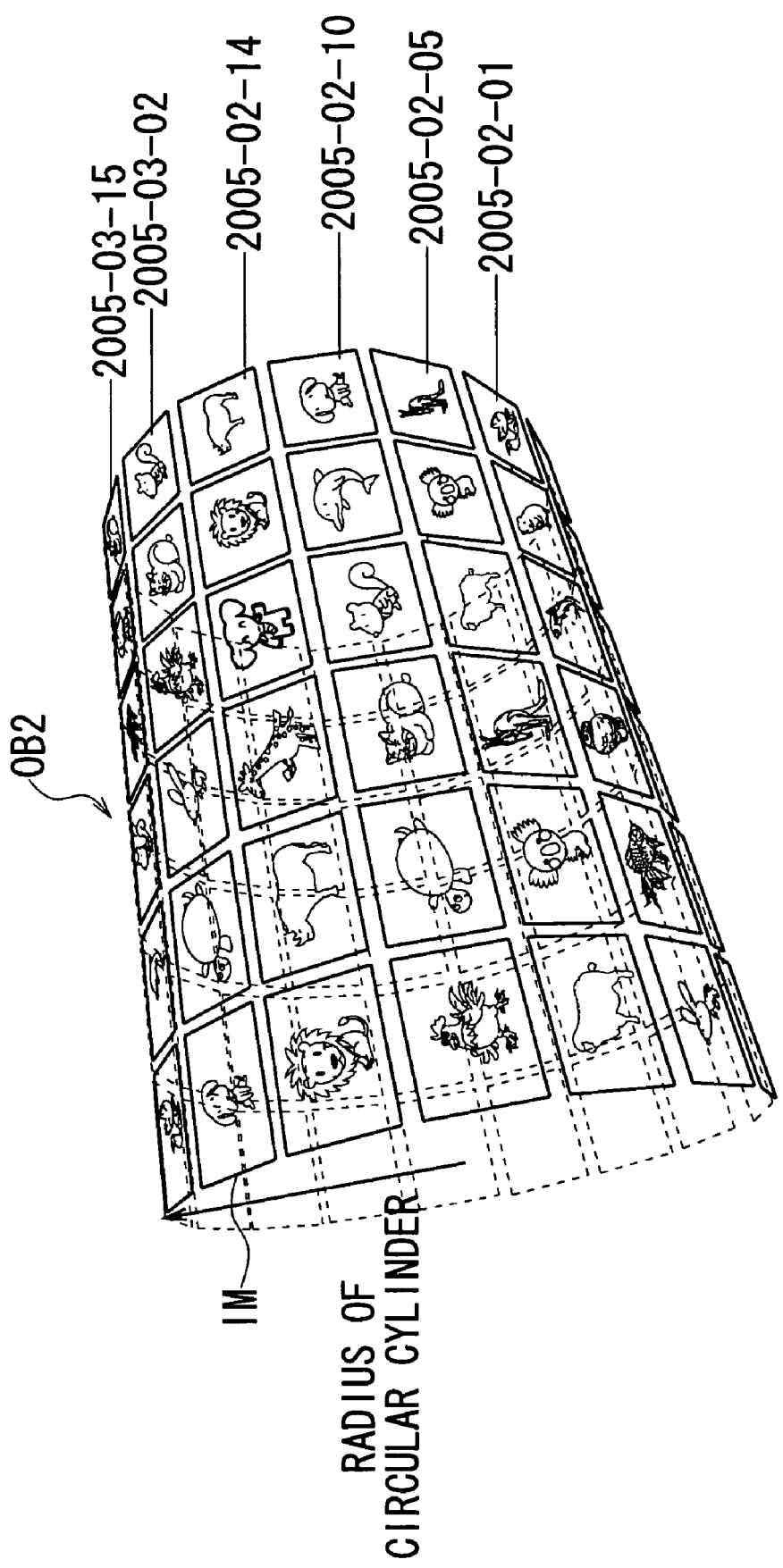
FIG. 6 is a schematic perspective view showing a cylindrical object classified by order of time.

The display content determination section 13 then lays out the thumbnail images of the multimedia files to the layout locations determined by the above method. This generates a cubic object OB1 (FIG. 5) and a cylindrical object OB2 (FIG. 6). The display content determination section 13 subsequently displays the cubic object OB1 and the cylindrical object OB2 on the display 6.

As a result, the sixteen thumbnail images IM of the multimedia files (Japanese Animals) categorized as Category 1 (Shooting Location: "Japan") are laid out to the front surface of the cubic object OB1 (FIG. 5), and the sixteen thumbnail images IM of the multimedia files (Australian Animals) categorized as Category 2 (Shooting Location: "Australia") are laid out to the right side surface of the cubic object OB1. In addition, the sixteen thumbnail images IM of the multimedia files (African Animals) categorized as Category 3 (Shooting Location: "Africa") are laid out to the top surface of the cubic object OB1.

The thumbnail images IM of the multimedia files categorized into other categories are laid out to the back, left side and under surfaces of the cubic object OB1, and therefore each of these surfaces also has sixteen thumbnail images IM (specified by dotted lines). In this case, the thumbnail images IM on the back, left side and under surfaces of the cubic object OB1 are not shown for simplicity. There are open spaces between the thumbnail images IM on the front, top and right side surfaces. This allows a user to visually check the thumbnail images IM (specified by dotted lines) on the back, left side and under surfaces through the open spaces.

On the other hand, each side surface of the cylindrical object OB2 (FIG. 6) is assigned to one of the shooting dates (2005Feb. 01, 2005 Feb. 05, 2005 Feb. 10, 2005 Feb. 14, 2005 Mar. 02, 2005 Mar. 15 . . . ). The thumbnail images IM sorted by order of shooting date are laid out to each side surface of the cylindrical object OB2.

Figure 7:
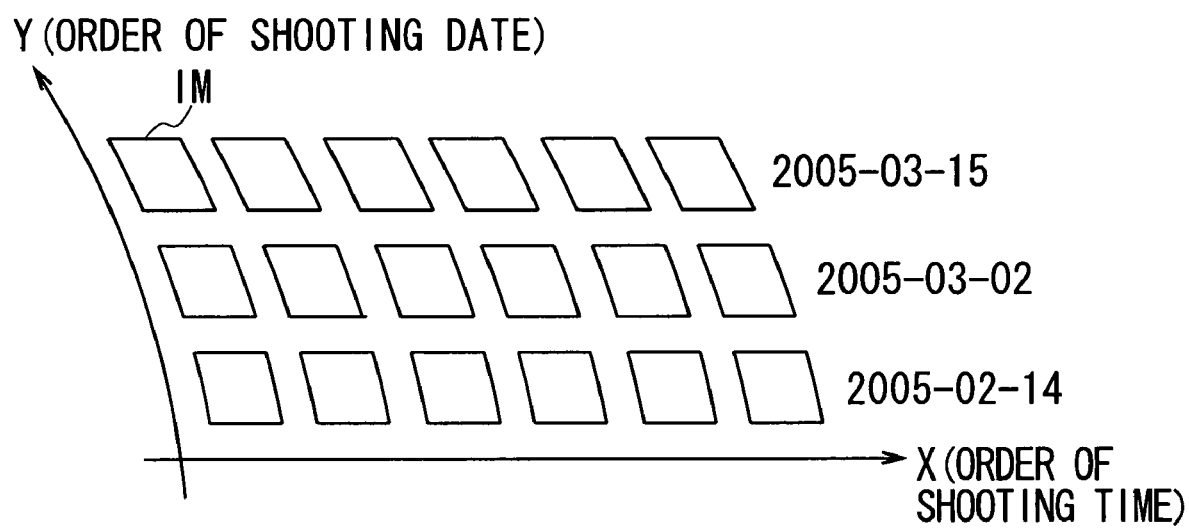
FIG. 7 is a schematic diagram illustrating a method of determining an layout area of thumbnail image by order of time.
Figure 8:
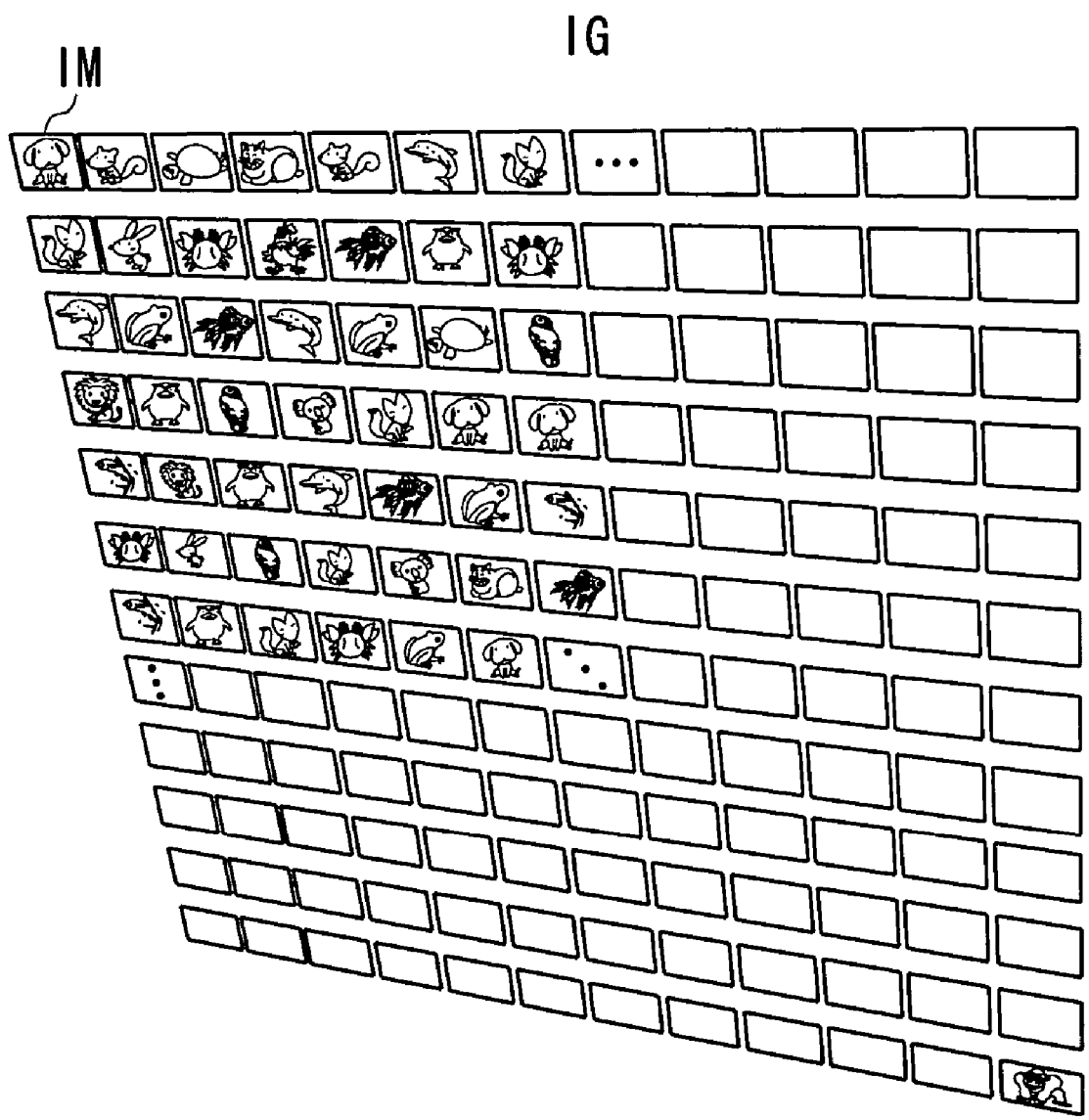
FIG. 8 is a schematic diagram showing a list screen.

In this case, as shown in FIG. 7, the display content determination section 13 lays out all the thumbnail images of multimedia files sorted by order of shooting date and time to all of the sixteen surfaces of the cylindrical object OB2, so that a rotation direction (Y axis) of the cylindrical object OB2 which rotates around a central axis represents an order of shooting date, and a longitudinal direction (X axis) of the cylindrical object OB2 represents an order of shooting time.

In addition, the shooting dates (year-month-day) are displayed on the right side of the cylindrical object OB2 such that each shooting date is next to the corresponding surface. This allows a user to intuitively recognize that the surfaces of the cylindrical object OB2 are in order of shooting date. In addition, on each surface of the cylindrical object OB2, the thumbnail images IM are placed from the left side to the right side in order of time. This allows a user to intuitively recognize shooting time of the thumbnail images IM and the like.

Other thumbnail images IM sorted by order of shooting date and time are laid out to blind surfaces (back side surfaces) of the cylindrical object OB2. In this case, the thumbnail images IM on the back side surfaces of the cylindrical object OB2 are not shown for simplicity. There are open spaces between the thumbnail images IM on the front side surfaces. This allows a user to visually check the thumbnail images IM on the back side surfaces through the open spaces.

By the way, in response to the input signal S1 supplied from the input reception section 11, the display content determination section 13 can change its display format from the three-dimensional cubic object OB1 and cylindrical object OB2 to a two-dimensional list screen IG where all the thumbnail images IM, which were displayed on the cubic object OB1 and the cylindrical object OB2, are displayed in list format in two-dimensional manner.

By the way, in response to the input signal S1, the display content determination section 13 can change its display format from the list screen IG to the cubic object OB1 or the cylindrical object OB2. In this manner, the cubic object OB1, the cylindrical object OB2 or the list screen IG is arbitrarily selected to be displayed on the display 6.

Figure 9:
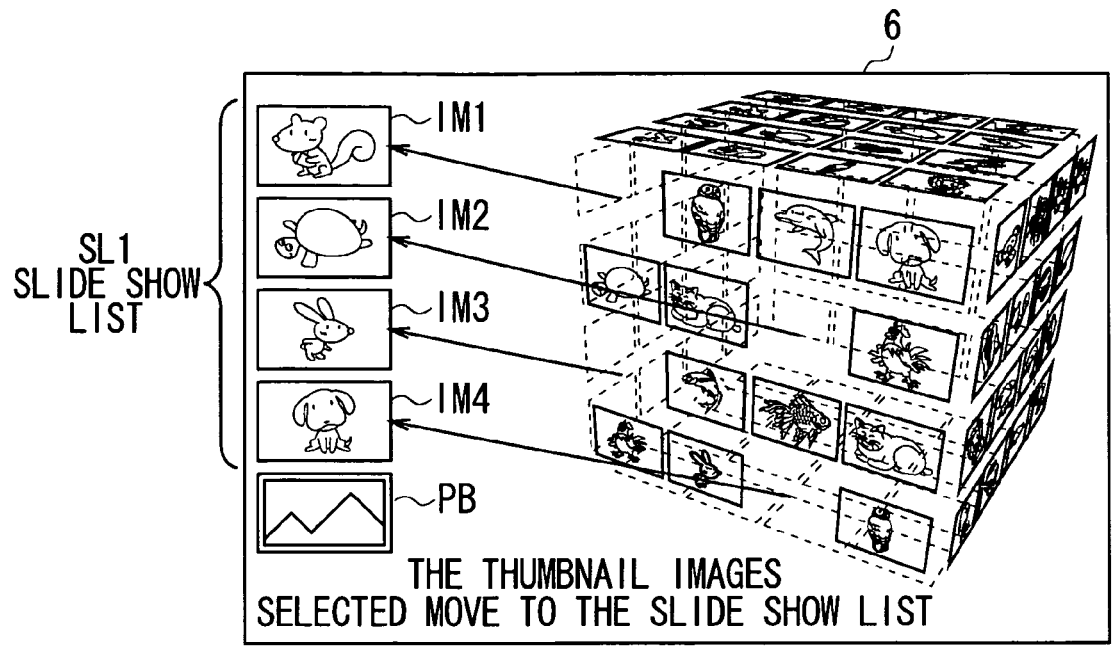
FIG. 9 is a schematic diagram illustrating addition and deletion of slide show list (1)

As shown in FIG. 9, when the thumbnail images IM1 to IM4, which are laid out to the surfaces of the cubic object OB1, are sequentially selected by a cursor (not shown), the display content determination section 13 takes the thumbnail images IM1 to IM4 away from the cubic object OB1 and then displays the thumbnail images IM1 to IM4 side-by-side on the left screen area of the display 6 in a two-dimensional manner to make a slide show list SL1. The slide show list SL1 is utilized to perform a slide show of the thumbnail images IM1 to IM4.

In this case, the thumbnail images IM1 to IM4, which were selected by the cursor, have been removed from their initial position (i.e. the surfaces of the cubic object OB1), because the thumbnail images IM1 to IM4 were moved to the slide show list SL1. This allows a user to instantly and intuitively determine from which category (surface) the thumbnail images IM1 to IM4 were selected.

By the way, the display content determination section 13 memorizes the initial layout areas CP1 of the selected thumbnail images IM1 to IM4 on the cubic object OB1. Therefore, the display content determination section 13 automatically moves the thumbnail images IM1 to IM4 from the slide show list SL1 to their initial layout areas CP1 on the cubic object OB1, after completing the slide show or when a user cancelled the slide show before it started.

Since the display content determination section 13 memorizes the initial layout areas CP1 of the thumbnail images IM1 to IM4 which were moved to the slide show list SL1, the display content determination section 13 can move the thumbnail images IM1 to IM4 from the slide show list SL1 to their initial areas when a user performs drag-and-drop operation or click operation to the thumbnail images IM1 to IM4. In addition, the display content determination section 13 can automatically move the thumbnail images IM1 to IM4 from the slide show list SL1 to their initial areas. In these cases, the thumbnail images IM1 to IM4 are removed from the slide show list SL1.

By the way, the slide show list SL1 includes a play button PB under the last-selected thumbnail image IM4. Clicking the play button PB starts process of slide show (described below).

Figure 10:
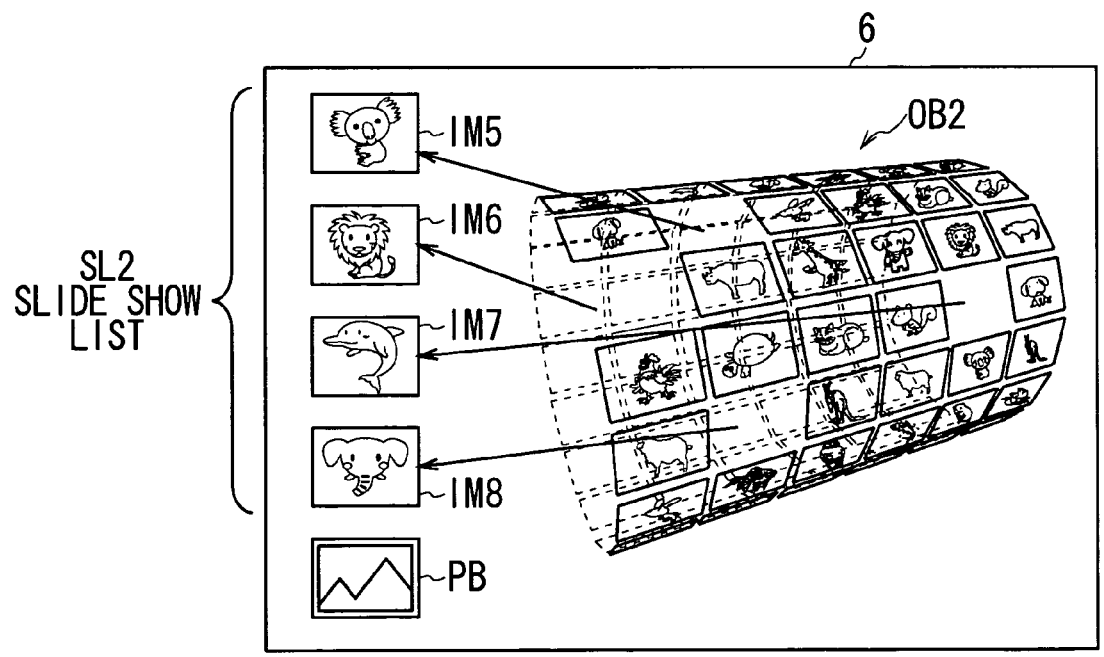
FIG. 10 is a schematic diagram illustrating a list-change process.

Similarly, as shown in FIG. 10, when the thumbnail images IM5 to IM8, which are laid out to the surfaces of the cylindrical object OB2, are sequentially selected by a cursor (not shown), the display content determination section 13 takes the thumbnail images IM5 to IM8 away from the cylindrical object OB2 and then displays the thumbnail images IM5 to IM8 side-by-side on the left screen area of the display 6 in a two-dimensional manner to make a slide show list SL2. The slide show list SL2 is utilized to perform a slide show of the thumbnail images IM5 to IM8.

In this case, the thumbnail images IM5 to IM8, which were selected by the cursor, have been removed from their initial areas (i.e. the surfaces of the cylindrical object OB2), because the thumbnail images IM5 to IM8 were moved to the slide show list SL2. This allows a user to instantly and intuitively understand which date and time thumbnail images (IM5 to IM8) were selected.

By the way, the display content determination section 13 memorizes the initial layout areas CP2 of the selected thumbnail images IM5 to IM8 on the cylindrical object OB2. Therefore, the display content determination section 13 automatically moves the thumbnail images IM5 to IM8 from the slide show list SL2 to their initial layout areas CP2 on the cylindrical object OB2, after completing the slide show or when a user cancelled the slide show before it started.

Since the display content determination section 13 memorizes the initial layout areas CP2 of the thumbnail images IM5 to IM8 which were moved to the slide show list SL2, the display content determination section 13 can move the thumbnail images IM5 to IM8 from the slide show list SL2 to their initial areas when a user performs drag-and-drop operation or click operation to the thumbnail images IM5 to IM8. In addition, the display content determination section 13 can automatically move the thumbnail images IM5 to IM8 from the slide show list SL2 to their initial areas. In these cases, the thumbnail images IM5 to IM8 are removed from the slide show list SL2.

By the way, the slide show list SL2 includes a play button PB under the last-selected thumbnail image IM8. Clicking the play button PB starts process of slide show (described below).

In addition, as shown in FIGS. 11A to 11C, dragging a mouse upward or downward on the screen displayed on the display 6 directs the display content determination section 13 to switch what the display 6 displays (i.e. the cubic object OB1) between an object list 1 and an object list n.

Specifically, the object list 1 in FIG. 11A for example is the cubic object OB1 where the thumbnail images are classified by Shooting Location (one of the categories), and the object list 2 in FIGS. 11B and 11C for example is the cubic object OB1 where the thumbnail images are classified by Music Genre (one of the categories), and so on. In this manner, there may be n kinds of object lists. When a user drags a mouse, the display content determination section 13 performs list-change process to switch what the display 6 displays between the object lists 1 through n.

(4) Three-Dimensional Object Display Process by Three-Dimensional Multimedia Browser The three-dimensional multimedia browser (FIG. 2) performs three-dimensional object display process using the cubic object OB1 and the cylindrical object OB2. This three-dimensional object display process will be described below.

Figure 12:
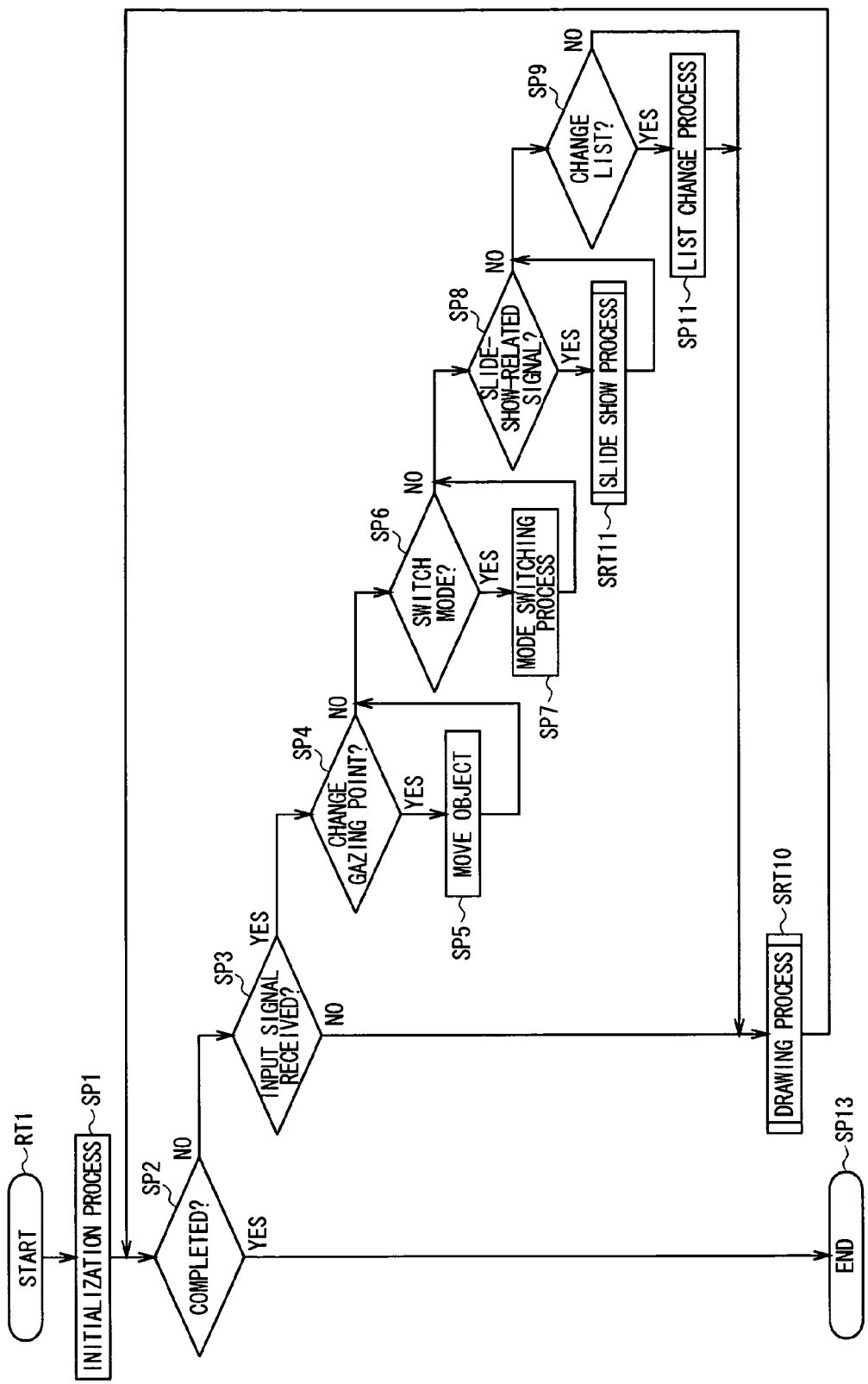
FIG. 12 is a flowchart illustrating a three-dimensional object display process.

As shown in FIG. 12, the three-dimensional multimedia browser starts a routine RT1 at start step, and then proceeds to step SP1 to perform initialization process.

Specifically, in the initialization process, the three-dimensional multimedia browser performs various processes, such as reading out the thumbnail images of the multimedia files from the hard disk drive 5, and generating a three-dimensional virtual space (with X, Y and Z-axis) by the virtual space generation section 12.

After that, the three-dimensional multimedia browser proceeds to step SP2 to determine whether to stop. For example, conditions of stopping the process are as follows: a user inputs a command to stop the three-dimensional object display program; or there is no way but to stop the three-dimensional object display program due to out-of-memory conditions or other hardware problems.

When the three-dimensional multimedia browser meets the conditions of stopping the process, affirmative result is obtained at step SP2, and then the CPU 2 stops the three-dimensional object display program. When the three-dimensional multimedia browser does not meet the conditions of stopping the process, negative result is obtained at step SP2, and then the three-dimensional multimedia browser proceeds to next step SP3.

The three-dimensional multimedia browser at step SP3 checks whether or not the input reception section 11 receives the input signal S1 from a user. When affirmative result is obtained at step SP3, the three-dimensional multimedia browser proceeds to next step SP4. When negative result is obtained at step SP3, the three-dimensional multimedia browser proceeds to next sub routine SRT10 to perform drawing process.

In the drawing process at the sub routine SRT10, there are two kinds of modes: polyhedron mode for drawing and generating the cubic object OB1; and cylinder mode for drawing and generating the cylindrical object OB2. The drawing process of the polyhedron mode (sub routine SRT10A) and cylinder mode (sub routine SRT10B) will be described.

Figure 13:
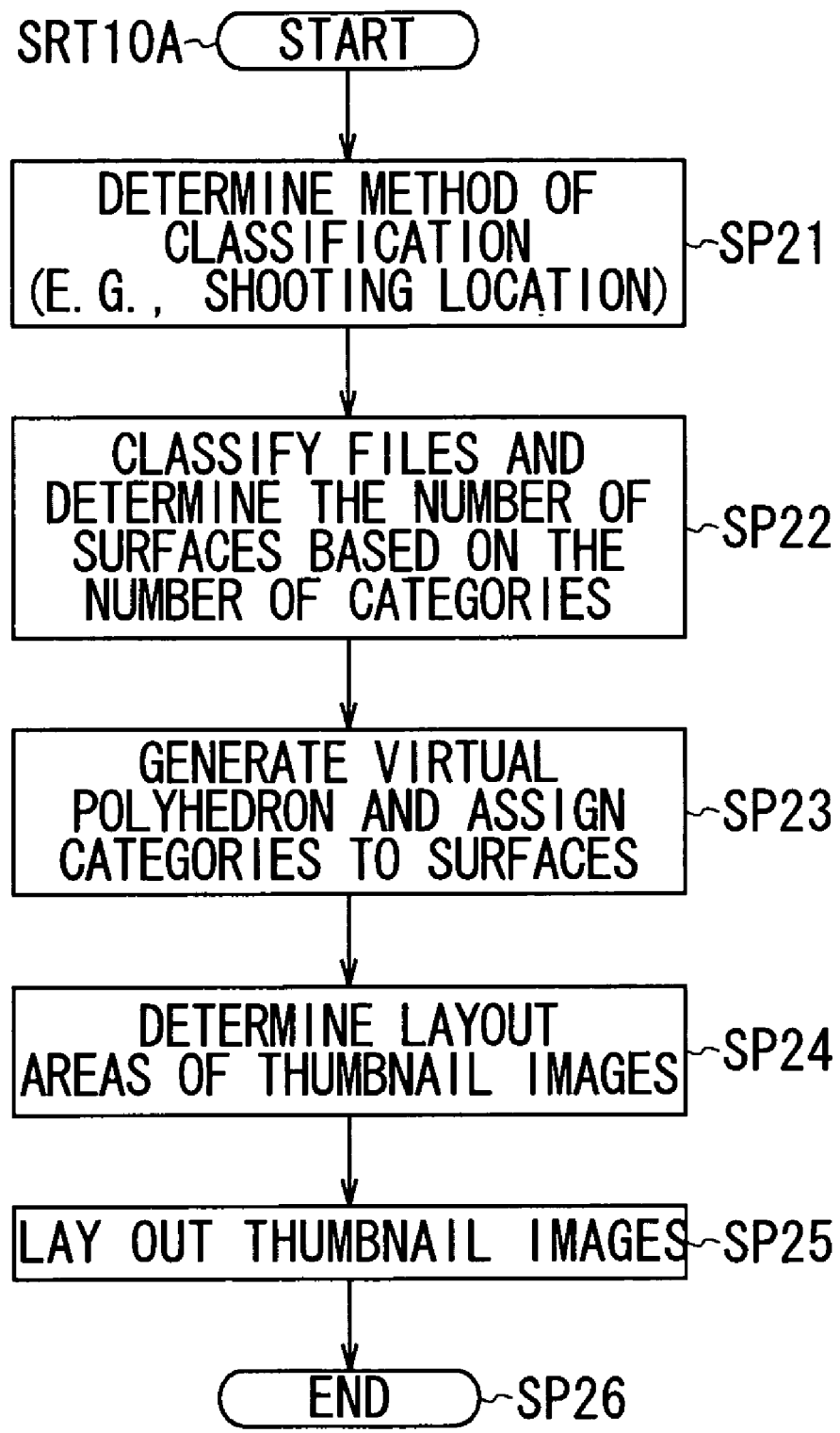
FIG. 13 is a flowchart illustrating a drawing process on polyhedron mode.

To perform the polyhedron mode of the drawing process, the three-dimensional multimedia browser starts the sub routine SRT10A (FIG. 13) from start step, and then proceeds to next step SP21. The three-dimensional multimedia browser at step SP21 determines, based on the input signal S1 input by a user, a classification method to classify the multimedia files. In this case, the three-dimensional multimedia browser chooses "Shooting Location" as the classification method. The three-dimensional multimedia browser may determine the classification method automatically. After that, the three-dimensional multimedia browser proceeds to next step SP22.

The three-dimensional multimedia browser at step SP22 classifies the multimedia files by "Shooting Location" which was determined at step SP21 as classification method. The three-dimensional multimedia browser then determines the number of surfaces of polyhedron, based on the number of categories of shooting locations (such as "Japan," "Australia," "Africa," and the like) . The three-dimensional multimedia browser subsequently proceeds to next step SP23.

Based on the number of surfaces determined at step SP22 (six surfaces, for example), the three-dimensional multimedia browser at step SP23 generates the virtual polyhedron KT1 (FIG. 3), which for example has six surfaces and is in the shape of a cubic. The three-dimensional multimedia browser then assigns a different category (such as "Japan," "Australia," "Africa," and the like) to each surface of the virtual polyhedron KT1, and then proceeds to next step SP24.

Based on the attribute information (Shooting Location) of the thumbnail images IM, the three-dimensional multimedia browser at step SP24 determines which thumbnail images IM of the multimedia files are laid out to which surfaces of the virtual polyhedron KT1 categorized, and then proceeds to next step SP25.

The three-dimensional multimedia browser at step SP25 lays out the thumbnail images IM to the locations determined at step SP24 to generate the cubic object OB1 (FIG. 5), and then displays the cubic object OB1 on the display 6. The three-dimensional multimedia browser subsequently proceeds to next step SP26 to complete the drawing process (sub routine SRT10A), and then returns to step SP2 in the routine RT1.

Figure 14:
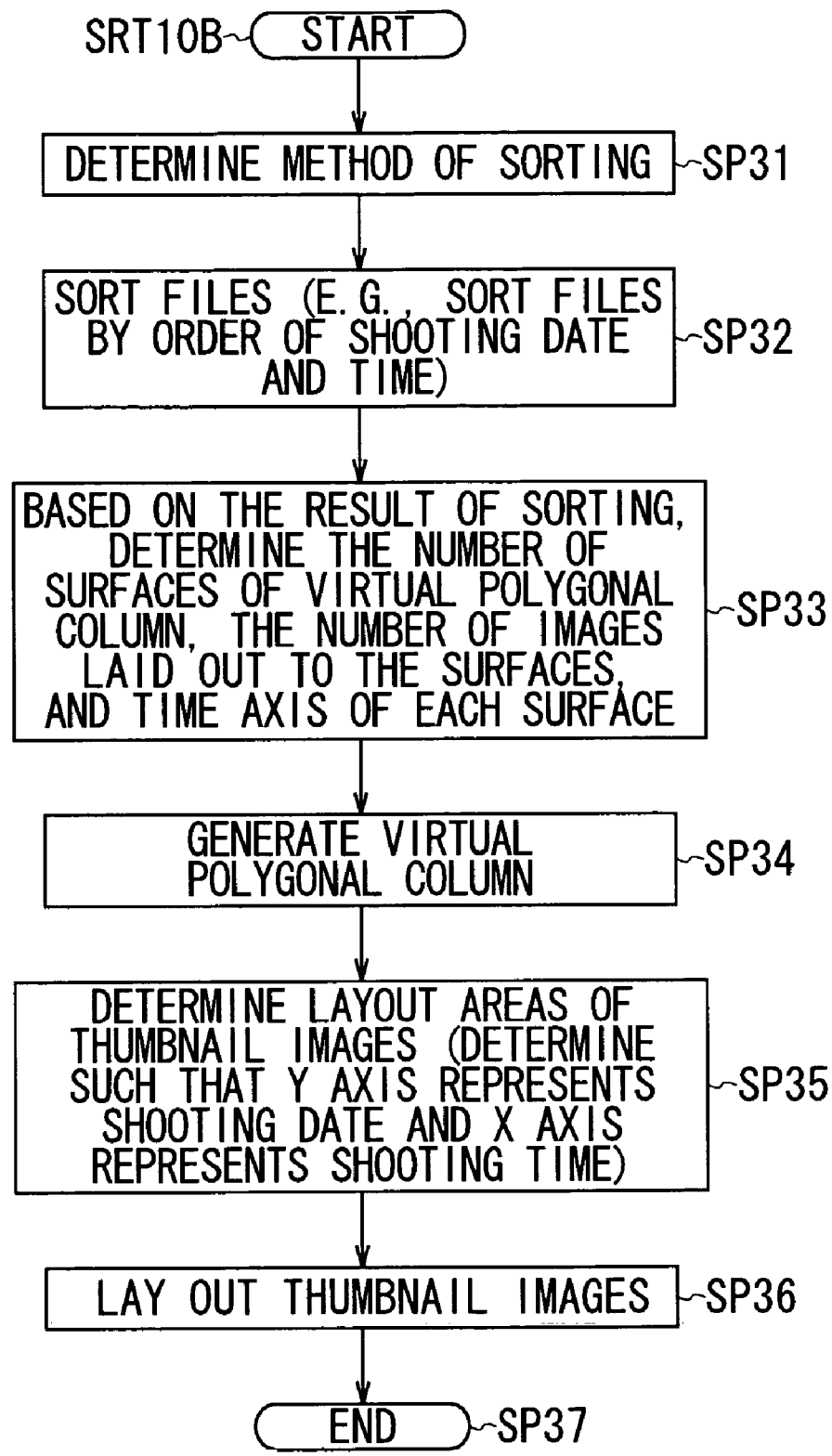
FIG. 14 is a flowchart illustrating a drawing process on cylinder mode.
Figure 15A:
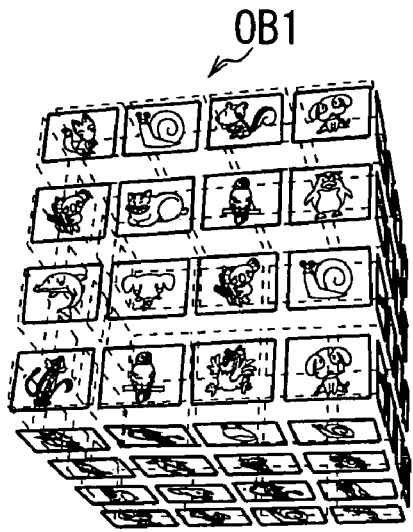
FIGS. 15A to 15D are schematic perspective views illustrating change of a gazing point on polyhedron mode.
Figure 15B:
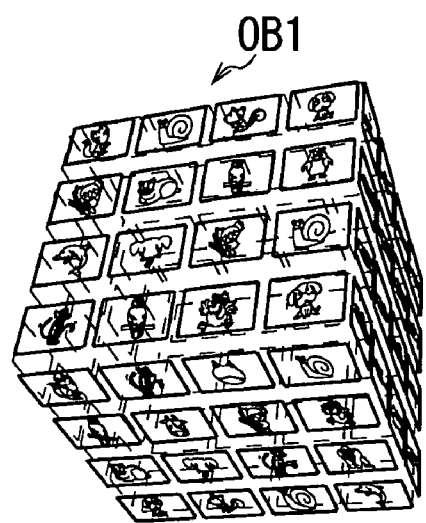
Figure 15D:
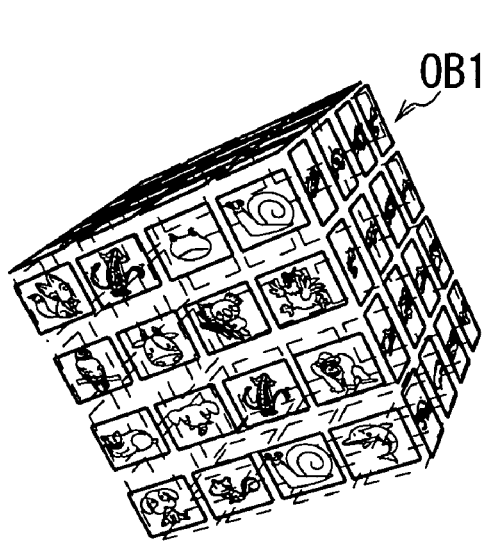
Figure 15C:
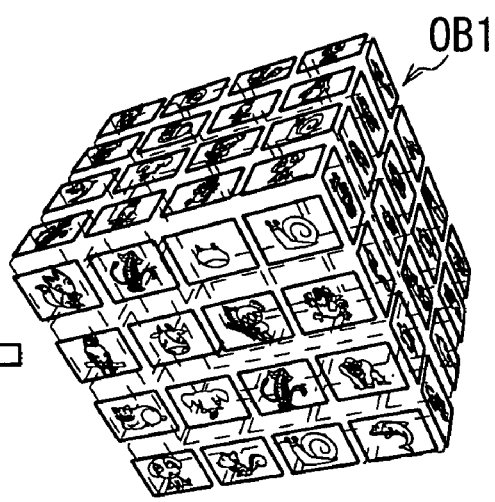

By contrast, to perform the cylinder mode of the drawing process, the three-dimensional multimedia browser starts the sub routine SRT10B (FIG. 14) from start step, and then proceeds to next step SP31. The three-dimensional multimedia browser at step SP31 determines, based on the input signal S1 input by a user, a sort method to sort the multimedia files. In this case, the three-dimensional multimedia browser chooses "Order of Shooting Date and Time" as the sort method. The three-dimensional multimedia browser may determine the sort method automatically. After that, the three-dimensional multimedia browser proceeds to next step SP32.

The three-dimensional multimedia browser at step SP32 sorts the multimedia files by "Order of Shooting Date and Time" which was determined at step SP31 as sort method. The three-dimensional multimedia browser then proceeds to next step SP33.

Based on the result of sorting at step SP32, the three-dimensional multimedia browser at step SP33 determines the number of surfaces of virtual polygonal column, the number of thumbnail images to be laid out to each surface, and the layout areas CP2 where the thumbnail images are laid out side-by-side in order of shooting time. The three-dimensional multimedia browser then proceeds to next step SP34.

The three-dimensional multimedia browser at step SP34 generates the virtual polygonal column KT2 in accordance with the number of surfaces determined at step SP33 (sixteen surfaces, in this case), the number of thumbnail images to be laid out to each surface determined at step SP33, and the like. The three-dimensional multimedia browser then proceeds to next step SP35.

The three-dimensional multimedia browser at step SP35 determines layout locations (surfaces, and locations on the surfaces) to which the thumbnail images IM are laid out, such that Y and X-axis represents Shooting Date and Shooting Time, respectively, as shown in FIG. 7. The three-dimensional multimedia browser then proceeds to next step SP36.

The three-dimensional multimedia browser at step SP36 lays out the thumbnail images IM to the layout areas CP2 determined at step SP35 to generate the cylindrical object OB2 (FIG. 6), and then displays the cylindrical object OB2 on the display 6. The three-dimensional multimedia browser subsequently proceeds to next step SP37 to complete the drawing process (sub routine SRT10B), and then returns to step SP2 in the routine RT1.

When the three-dimensional multimedia browser proceeds to next step SP4 after obtaining negative result at step SP2 and affirmative result at step SP3, the three-dimensional multimedia browser checks whether or not the input signal S1 received from the input reception section 11 is a command directing the three-dimensional multimedia browser to switch a point of cubic object OB1 (or cylindrical object OB2) which is displayed on the display 6 by the sub routine SRT10 and which a user can see; or a command directing the three-dimensional multimedia browser to zoom in or out the cubic object OB1 (or the cylindrical object OB2). The point of cubic object OB1 (or cylindrical object OB2) which a user can see is referred to as a gazing point.

Affirmative result at step SP4 means that the input signal S1 is the command directing the three-dimensional multimedia browser to switch the gazing point; or the command directing the three-dimensional multimedia browser to zoom in or out. In this case, the three-dimensional multimedia browser proceeds to next step SP5. By contrast, when negative result is obtained at step SP4, the three-dimensional multimedia browser proceeds to next step SP6 without processing the cubic object OB1 (or the cylindrical object OB2).

When the input signal S1 is the command directing the three-dimensional multimedia browser to switch the gazing point, the three-dimensional multimedia browser at step SP5 moves the cubic object OB1, the cylindrical object OB2 or the list screen IG to change the gazing point of user. When the input signal S1 is the command directing the three-dimensional multimedia browser to zoom in or out, the three-dimensional multimedia browser zooms in or out the cubic object OB1, cylindrical object OB2 or list screen IG displayed. The three-dimensional multimedia browser then proceeds to next step SP6.

When the input signal S1 is the command directing the three-dimensional multimedia browser to switch the gazing point and the three-dimensional multimedia browser is the polyhedron mode displaying the cubic object OB1, the three-dimensional multimedia browser rotates the cubic object OB1 around its center of gravity in all directions to change the gazing point of user as shown in FIGS. 15A through 15D.

Figure 16A:
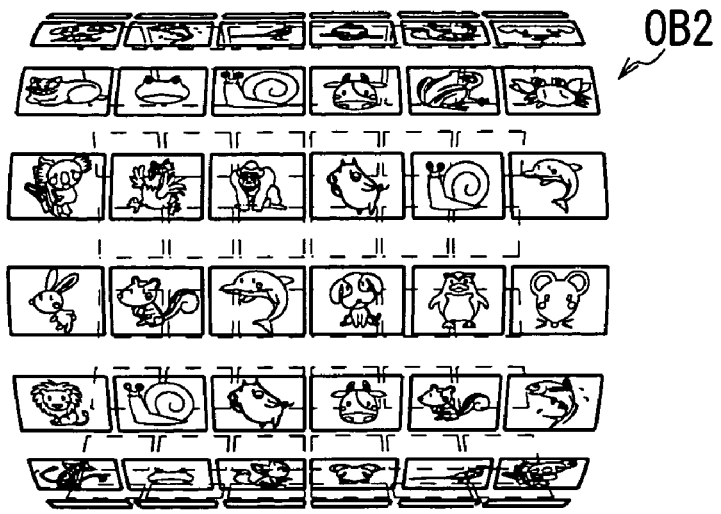
FIGS. 16A to 16C are schematic perspective views illustrating change of a gazing point on cylinder mode.
Figure 16B:
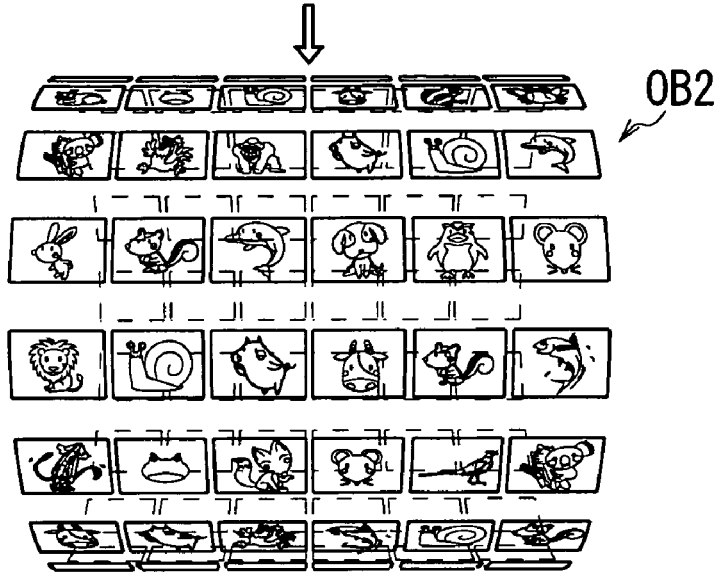
Figure 16C:
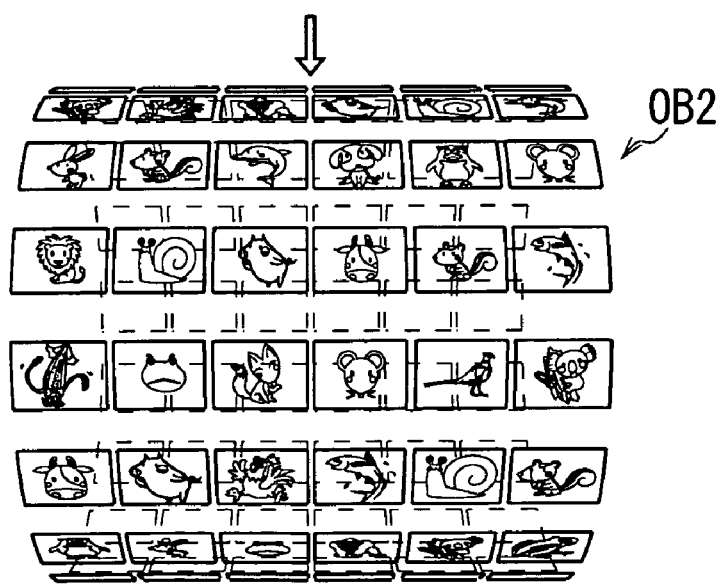

When the input signal S1 is the command directing the three-dimensional multimedia browser to switch the gazing point and the three-dimensional multimedia browser is the cylinder mode displaying the cylindrical object OB2, the three-dimensional multimedia browser rotates the cylindrical object OB2 360 degrees around its central line (parallel with its longitudinal direction) little by little to change the gazing point of user as shown in FIGS. 16A through 16C. This allows a user to visually check all the sixteen surfaces of the cylindrical object OB2.

Figure 17A:
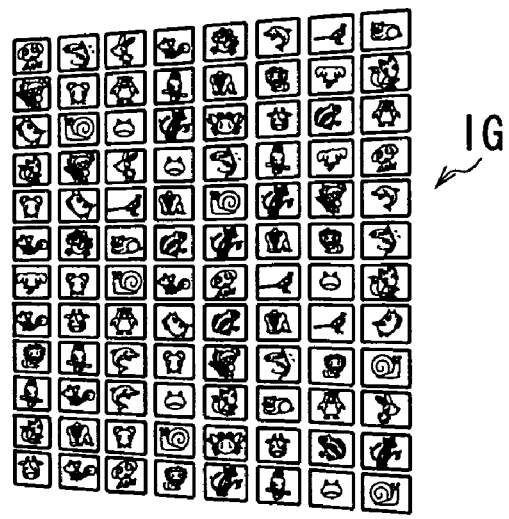
FIGS. 17A to 17C are schematic perspective views illustrating change of a gazing point on list mode.
Figure 17B:
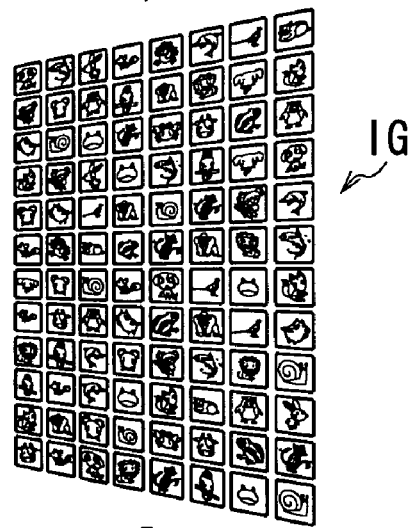
Figure 17C:
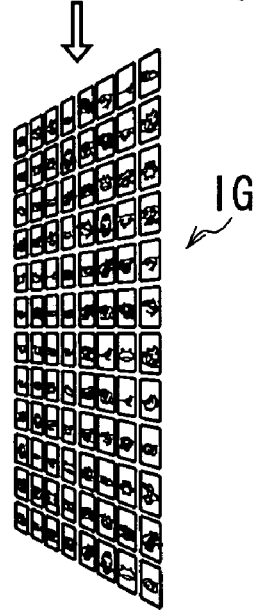

When the input signal S1 is the command directing the three-dimensional multimedia browser to switch the gazing point and the three-dimensional multimedia browser displays the list screen IG, the three-dimensional multimedia browser rotates the list screen IG to change the gazing point of user to the list screen IG as shown in FIGS. 17A through 17C.

Figure 18:
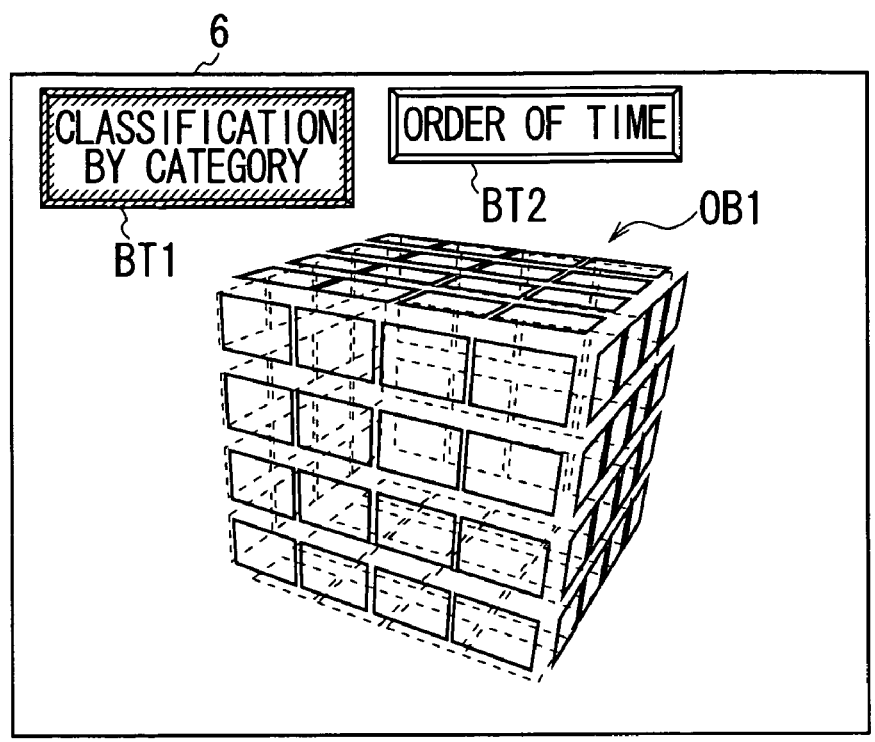
FIG. 18 is a schematic diagram illustrating operation of selecting a Classification by Category button.
Figure 19:
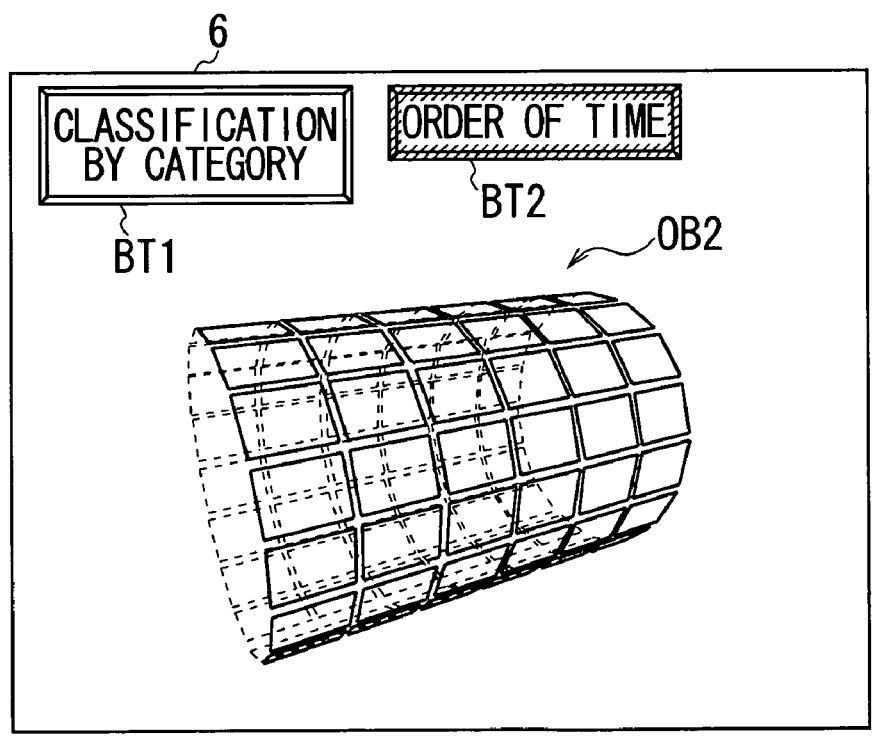
FIG. 19 is a schematic diagram illustrating operation of selecting an Order of Time button.

At step SP6, when the input signal S1 received from the input reception section 11 is the one generated by selecting "Classification by Category" button BT1 displayed on the display 6 with the cubic object OB1 as shown in FIG. 18, the three-dimensional multimedia browser obtains affirmative result and then proceeds to next step SP7. When the input signal S1 received from the input reception section 11 at step SP6 is the one generated by selecting "Order of Time" button BT2 displayed on the display 6 with the cylindrical object OB2 as shown in FIG. 19, the three-dimensional multimedia browser obtains affirmative result and then proceeds to next step SP7. When nothing is selected at step SP6, the three-dimensional multimedia browser obtains negative result and then proceeds to step SP8 without performing mode-switching process.

Figure 20A:
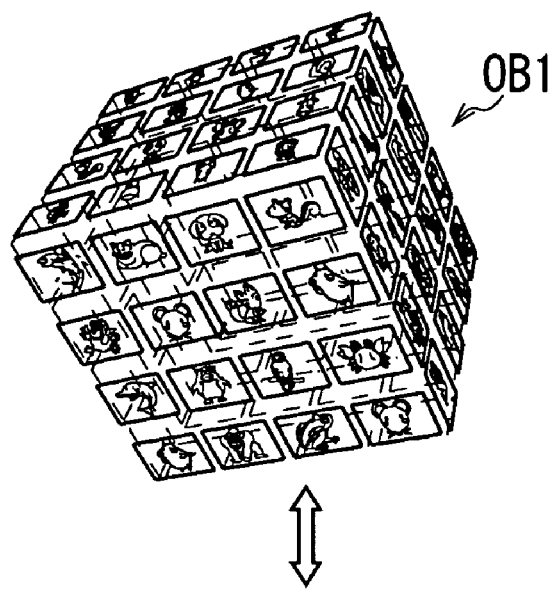
FIGS. 20A to 20C are schematic perspective views illustrating a mode-switching process.
Figure 20B:
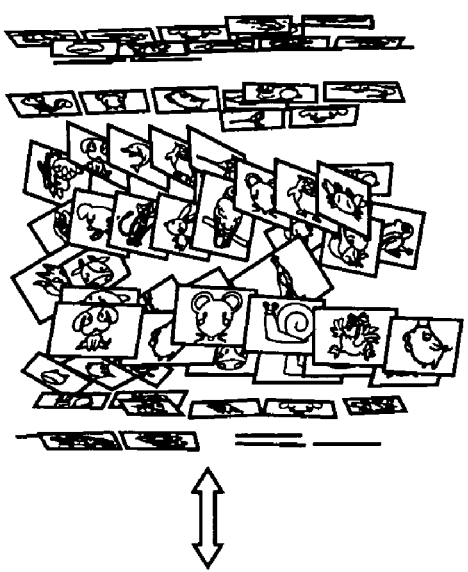

When the input signal S1 is the one generated by selecting "Order of Time" button BT2, the three-dimensional multimedia browser at step SP7 seamlessly switches the three-dimensional figure from the cubic object OB1 of polyhedron mode (FIG. 20A) to the cylindrical object OB2 of cylinder mode (FIG. 20C) through the situation shown in FIG. 20B. The three-dimensional multimedia browser then proceeds to step SP8.

On the other hand, when the input signal S1 is the one generated by selecting "Classification by Category" button BT1, the three-dimensional multimedia browser at step SP7 seamlessly switches the three-dimensional figure from the cylindrical object OB2 of cylinder mode (FIG. 20C) to the cubic object OB1 of polyhedron mode (FIG. 20A) through the situation shown in FIG. 20B. The three-dimensional multimedia browser then proceeds to step SP8.

In this manner, the three-dimensional multimedia browser performs mode-switching process where the cubic object OB1 is switched to the cylindrical object OB2, or the cylindrical object OB2 is switched to the cubic object OB1. Accordingly, the three-dimensional multimedia browser can changes its display format of the thumbnail images IM in accordance with the presentation manner ("Classification by Category" or "Order of Time") a user desires.

Thus, a user can intuitively recognize that the surfaces of the cubic object OB1 are classified by category (Shooting Location: "Japan," "Australia," "Africa," and the like) by just watching the thumbnail images IM laid out to the surfaces of the cubic object OB1.

That is to say, a user can instantly and intuitively recognize that all the thumbnail images IM on a certain surface of the cubic object OB1 is classified as "Africa" (Shooting Location) by just watching the thumbnail images IM (such as "Lion" or "Gorilla") laid out to this surface.

At the same time, the user can visually check the thumbnail images IM on the back-side surfaces through the open spaces between the thumbnail images on the surfaces the user currently sees. Therefore, the user can check not only three front-side surfaces, which are visible from a user even if it does not have the open spaces, but also three back-side surfaces, which are invisible from a user if it does not have the open spaces. This allows a user to instantly and intuitively understand the categories of the back-side surfaces.

In addition, a user can instantly and intuitively recognize that the surfaces of the cylindrical object OB2 is sorted by Order of Shooting Date, and that the thumbnail images are in order of Shooting Time on each surface, by just visually checking the date displayed next to each surface of the cylindrical object OB2 whose surfaces are sorted by Order of Shooting Date and Time.

The three-dimensional multimedia browser at step SP8 checks whether or not the input signal S1 is a slide-show-related signal. The slide-show-related signal includes the one generated by clicking the thumbnail images IM for nomination of slide show; and the one generated by clicking the play button PB. When affirmative result is obtained at step SP8, the three-dimensional multimedia browser starts a sub routine SRT11 to perform slide show display process. When negative result is obtained at step SP8, the three-dimensional multimedia browser proceeds to next step SP9.

Figure 21:
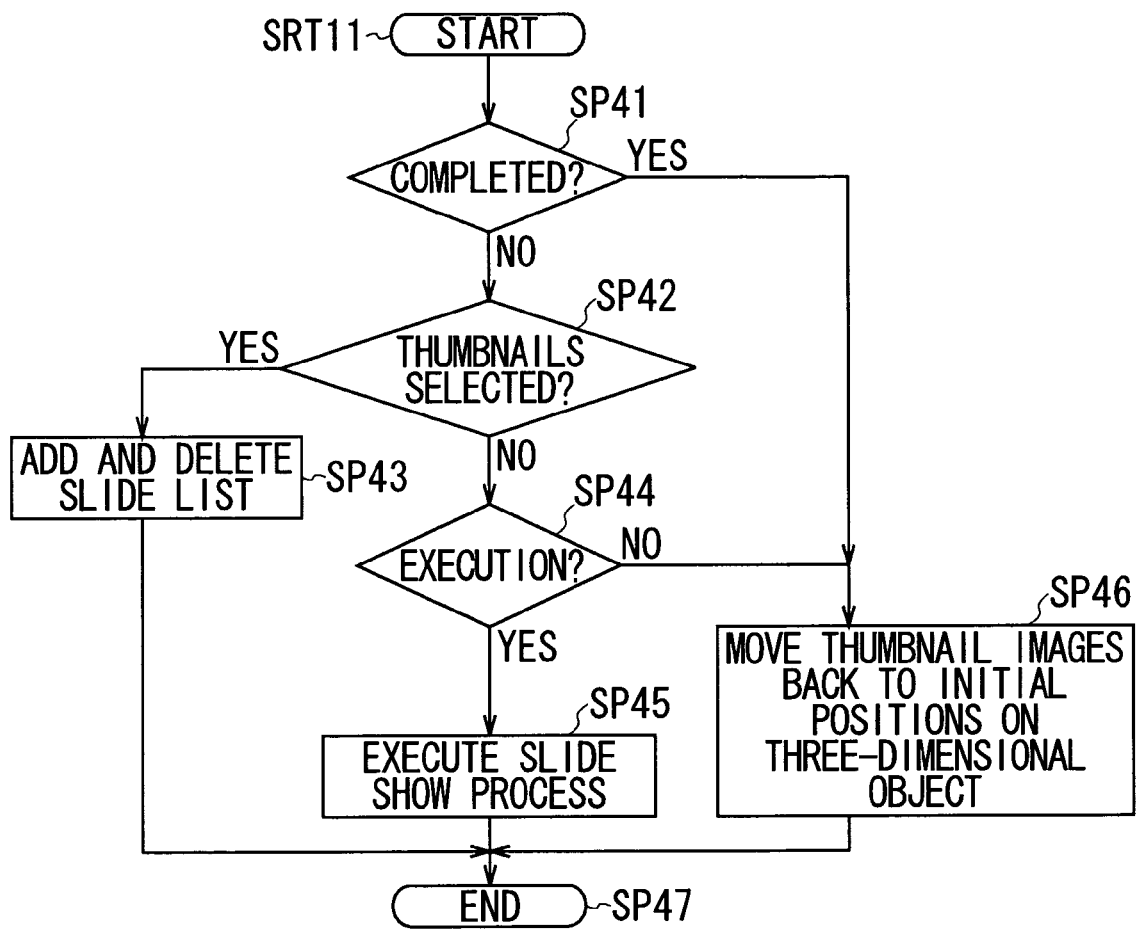
FIG. 21 is a flowchart illustrating a slide show display process.

As shown in FIG. 21, to perform the slide show display process, the three-dimensional multimedia browser starts the sub routine SRT11 from start step, and then proceeds to next step SP41. At step SP41, the three-dimensional multimedia browser checks whether or not the input signal S1 input by a user is the one directing the three-dimensional multimedia browser to stop the slide show. When affirmative result is obtained at step SP41, the three-dimensional multimedia browser proceeds to step SP46. When negative result is obtained at step SP41, the three-dimensional multimedia browser proceeds to step SP42.

The three-dimensional multimedia browser at step SP42 checks whether or not a user has chosen his/her desired thumbnail images IM to be used in the slide show from the surfaces of the cubic object OB1 or cylindrical object OB2. When negative result is obtained at step SP42, the three-dimensional multimedia browser proceeds to step SP43.

Figure 22:
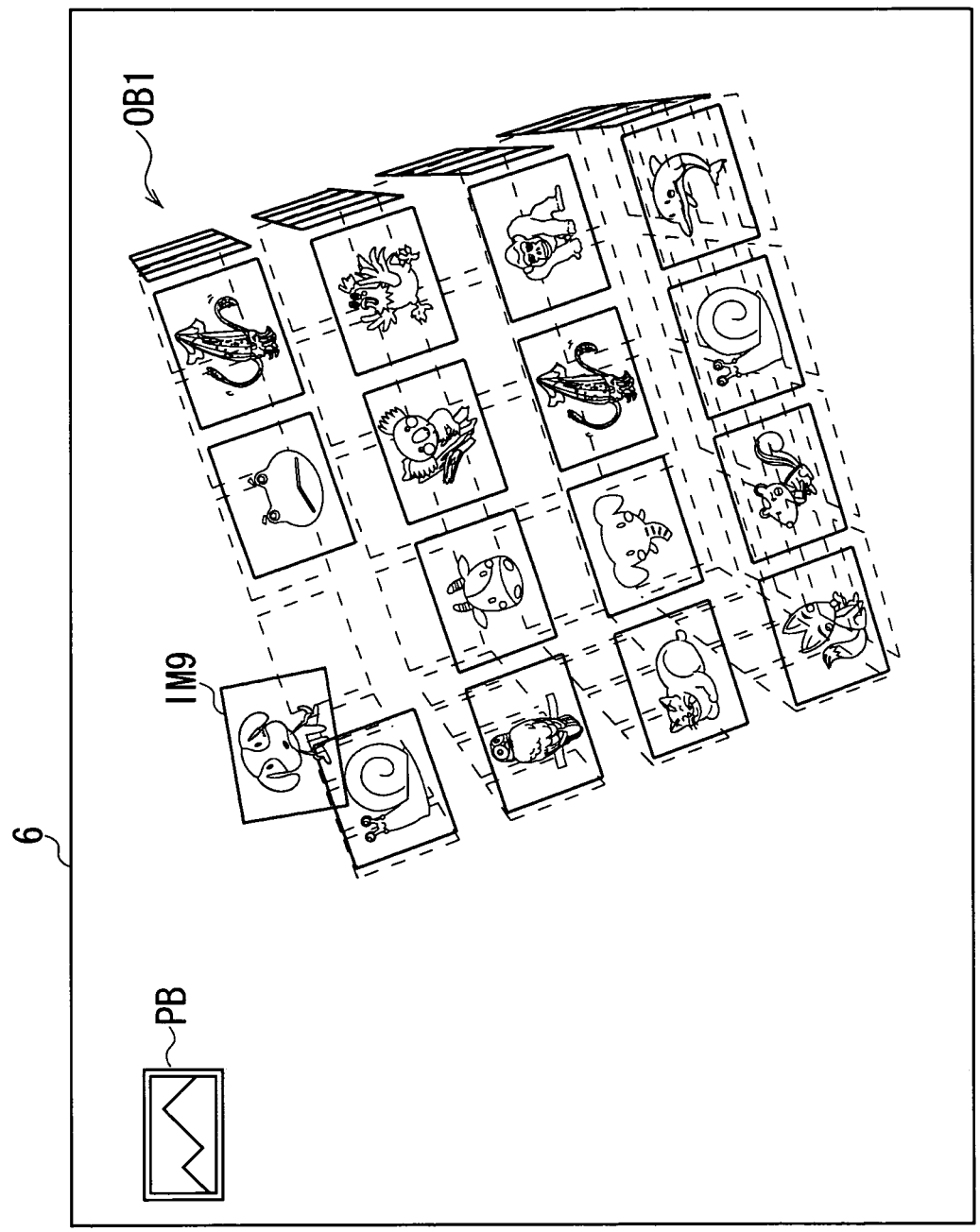
FIG. 22 is a schematic diagram illustrating generation of a slide show list (1)
Figure 23:
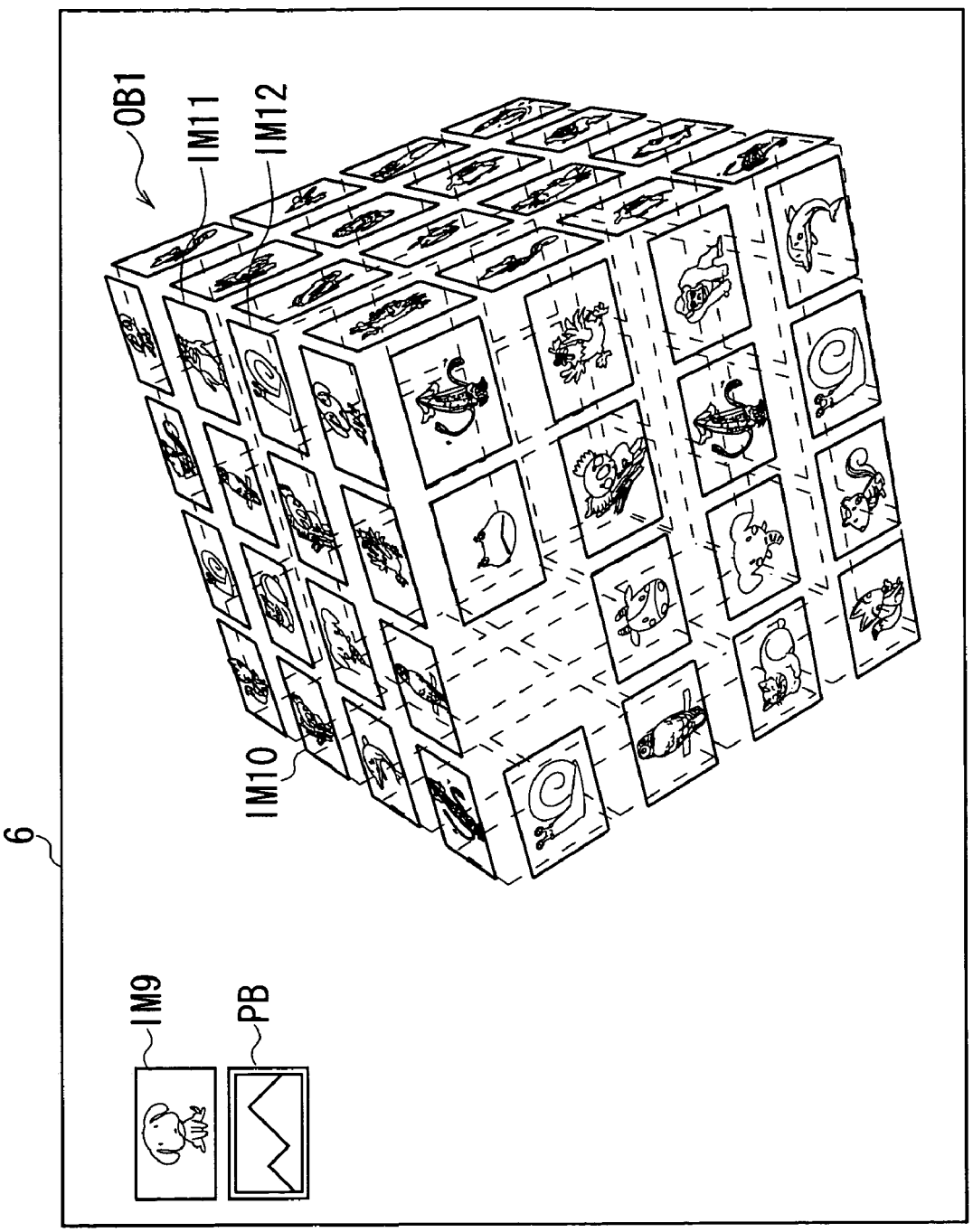
FIG. 23 is a schematic diagram illustrating generation of a slide show list (2)
Figure 24:
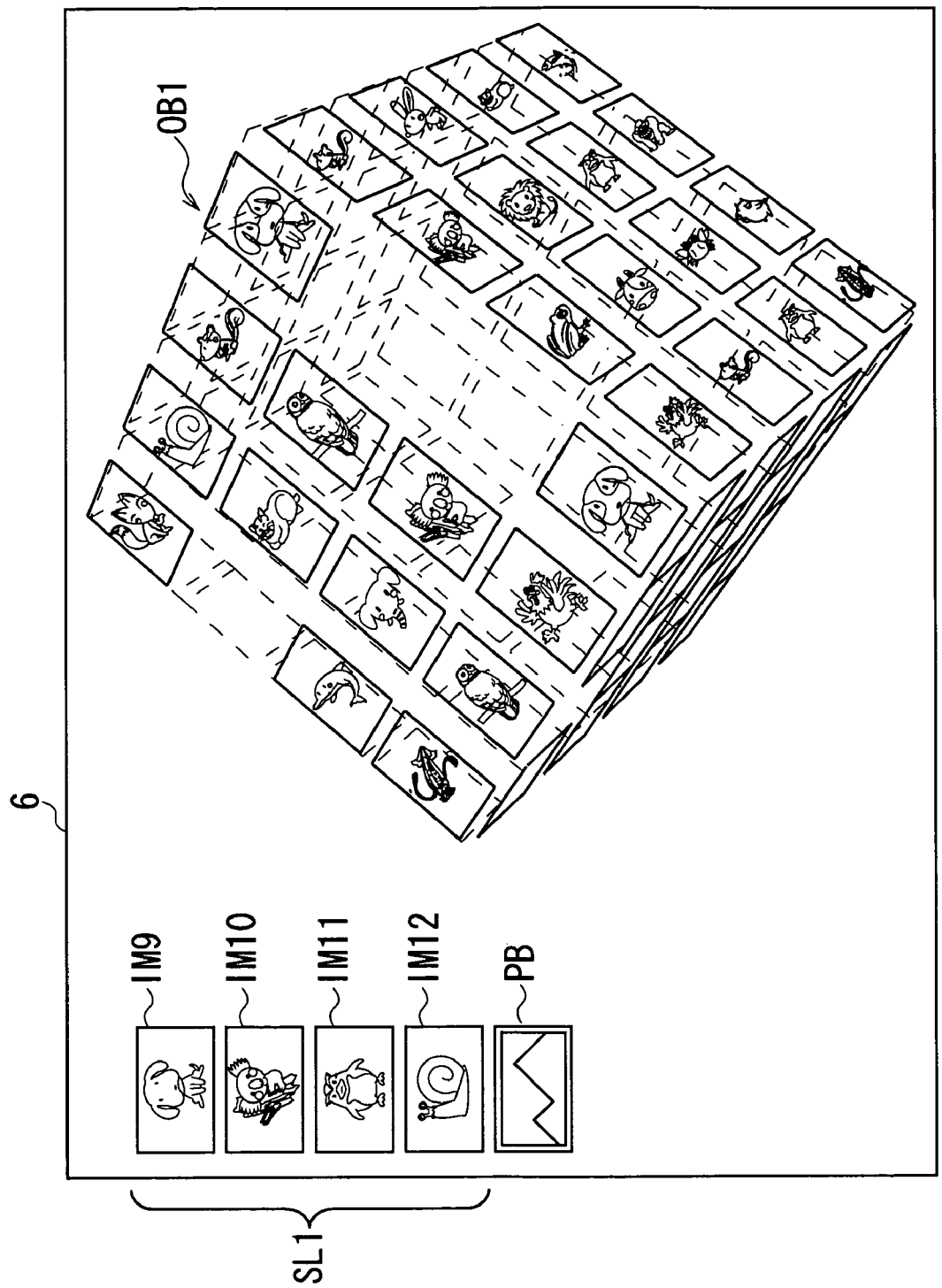
FIG. 24 is a schematic diagram illustrating generation of a slide show list (3)

As shown in FIG. 22 to FIG. 24, for example, while the thumbnail images IM9 to IM12 are chosen one after another from the surfaces of the cubic object OB1, the three-dimensional multimedia browser at step SP43 displays the thumbnail images IM9 to IM12 one after another on the slide show list SL1 so that the thumbnail images IM9 to IM12 on the slide show list SL1 are displayed in order of selection in a longitudinal direction in a two-dimensional manner. The three-dimensional multimedia browser then proceeds to next step SP47 to stop the process.

When the thumbnail images IM9 to IM12 on the above-noted slide show list SL1 are clicked at step SP43, the three-dimensional multimedia browser moves the selected thumbnail images IM9 to IM12 back to the initial layout areas CP1 on the surfaces of the cubic object OB1 and displays them in three-dimensional manner. The three-dimensional multimedia browser then proceeds to next step SP47 to stop the process.

By contrast, negative result at step SP42 means that the input signal S1 is not the one generated by selecting the thumbnail images IM. In this case, the three-dimensional multimedia browser proceeds to next step SP44.

The three-dimensional multimedia browser at step SP44 checks whether or not the input signal S1 is a play command generated by clicking the play button PB. When affirmative result is obtained at step SP44, the three-dimensional multimedia browser proceeds to next step SP45. When negative result is obtained at step SP44, the three-dimensional multimedia browser proceeds to next step SP46.

Figure 25A:
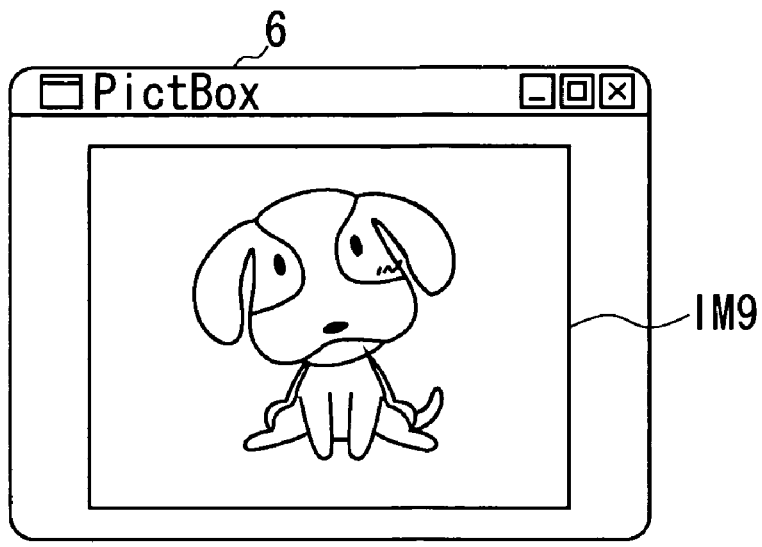
FIGS. 25A to 25C are schematic diagrams illustrating process of performing a slide show.
Figure 25B:
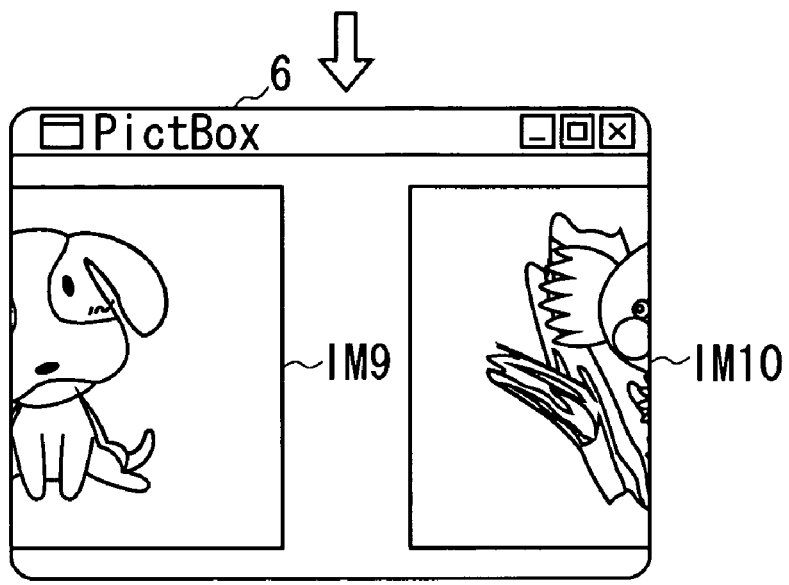
Figure 25C:
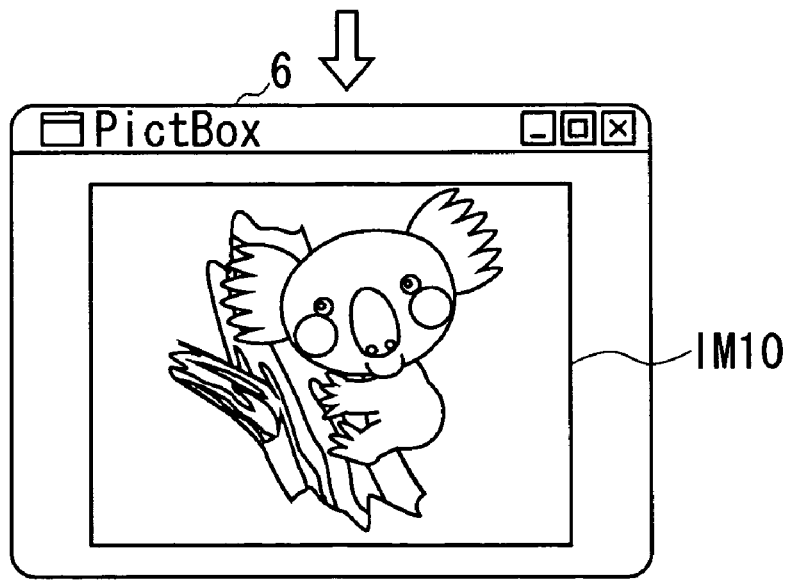

Because the input signal S1 is the play command of slide show, as shown in FIGS. 25A to 25C, the three-dimensional multimedia browser at step SP45 sequentially displays the thumbnail images IM9 to IM12, which were on the slide show list SL1, on the display 6 in order of selection such that each thumbnail image IM9 to IM12 is magnified and being displayed for a certain period of time one after another. The three-dimensional multimedia browser then proceeds to next step SP47 to stop the process.

In a case in which the input signal S1 is the one directing the three-dimensional multimedia browser to stop the slide show at step SP41; or a cancellation command (not the play command) at step SP44, the three-dimensional multimedia browser at step SP46 does not perform the slide show, and moves the thumbnail images IM9 to IM12 from the slide show list SL1 to the initial layout areas CP1 on the surfaces of the cubic object OB1. The three-dimensional multimedia browser then proceeds to next step SP47 to stop the process.

The three-dimensional multimedia browser at step SP9 checks whether or not the input signal S1 is a command directing the three-dimensional multimedia browser to perform the list-change process by mouse drag. When affirmative result is obtained at step SP9, the three-dimensional multimedia browser proceeds to next step SP11. When negative result is obtained at step SP9, the three-dimensional multimedia browser proceeds to next sub routine SRT10 to perform drawing process in dependence upon the input signal S1.

As shown in FIGS. 11A to 11C, in response to user's mouse-drag operation, the three-dimensional multimedia browser at step SP11 for example switches what it displays from the cubic object OB1 of the object list 1 to the cubic object OB1 of the object list 2, the cubic object OB1 of the object list 3, the cubic object OB1 of the object list 4, or the like. In this manner, the three-dimensional multimedia browser sequentially performs the list-change process within the number of object lists, and displays the cubic object OB1 corresponding to user's desired number of object list. The three-dimensional multimedia browser then proceeds to next sub routine SRT10 to perform drawing process in dependence upon the input signal S1.

In this manner, after the three-dimensional multimedia browser performs drawing process for the cubic object OB1 or cylindrical object OB2 of sub routine SRT10, the three-dimensional multimedia browser repeats the process from step SP2. This allows the three-dimensional multimedia browser to change the gazing point, to switch its mode between the polyhedron mode and the cylinder mode, to perform the slide show, and to perform the list-change process.

(5) Operation and Effect

The three-dimensional multimedia browser with above configuration lays out the thumbnail images IM, which represent the plurality of multimedia files, to the surfaces of the virtual polyhedron KT1 or virtual polygonal column KT2 which is formed into a three-dimensional figure. This generates the cubic object OB1 (FIG. 18) or the cylindrical object OB2 (FIG. 19). The three-dimensional multimedia browser then displays the cubic object OB1 or the cylindrical object OB2 at the display 6.

When a user selects the "Classification by Category" button BT1 or the "Order of Time" button BT2, which are displayed on the display 6 with the cubic object OB1 or the cylindrical object OB2, the three-dimensional multimedia browser switches its display format, in response to the selected presentation manner, from the cubic object OB1 to the cylindrical object OB2, or from the cylindrical object OB2 to the cubic object OB1.

Therefore, when the "Classification by Category" button BT1 is selected, the three-dimensional multimedia browser can switch what it displays to the cubic object OB1 whose surfaces are classified by category. When the "Order of Time" button BT2 is selected, the three-dimensional multimedia browser can switch what it displays to the cylindrical object OB2 whose surfaces are associated with corresponding Shooting Date. Therefore, a user can instantly and intuitively understand whether the current display mode is Classification by Category or Order of Time by just visually checking the cubic object OB1 or the cylindrical object OB2.

At this time, the three-dimensional multimedia browser randomly displays sixteen thumbnail images IM on each square surface of the cubic object OB1 such that four thumbnail images are placed in both a vertical and horizontal direction. Therefore, a user can easily recognize that the surfaces of the cubic object OB1 are classified by category by just watching the sixteen thumbnail images laid out to each surface.

In addition, the three-dimensional multimedia browser displays the thumbnail images IM side-by-side in a horizontal direction on each surface of the cylindrical object OB2. Therefore, a user can easily recognize that the surfaces of the cylindrical object OB2 are sorted by Order of Shooting Date and Order of Shooting Time by just watching the thumbnail images IM laid out to each surface.

Therefore, using the three-dimensional multimedia browser, a user can automatically and intuitively recognize that the cubic object OB1 is classified by category and that the cylindrical object OB2 is sorted by order of time. In addition, the three-dimensional multimedia browser can display the images in a visually easy-to-see manner.

Figure 20C:
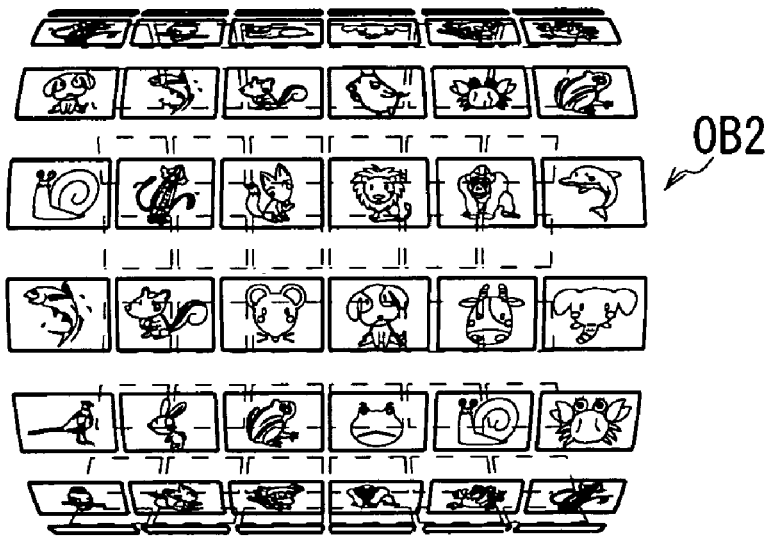

In addition, when the three-dimensional multimedia browser switches its display format from the cubic object OB1 to the cylindrical object OB2 (or from the cylindrical object OB2 to the cubic object OB1), the three-dimensional multimedia browser seamlessly switches its display format between the cubic object OB1 and the cylindrical object OB2, as shown in FIGS. 20A to 20C. This allows a user to visually recognize that the three-dimensional multimedia browser changes the order of the thumbnail images IM, which are displayed on both the cubic object OB1 and the cylindrical object OB2, in accordance with the presentation manner (Classification by Category or Order of Time).

Furthermore, the three-dimensional multimedia browser lays out the thumbnail images IM to the surfaces of the cubic object OB1 and cylindrical object OB2 such that the thumbnail images IM are evenly spaced apart from each other. Therefore, not only can a user visually check the thumbnail images IM which are generally visible from the front side, but also the user can visually check the thumbnail images IM on the back-side surfaces, which are generally invisible from the front side, through the open spaces between the thumbnail images IM. This increases the number of thumbnail images IM a user can check at one time, without changing the gazing point of the cubic object OB1 or the cylindrical object OB2.

In this manner, the three-dimensional multimedia browser can show a user a lot of thumbnail images IM at one time. This reduces the number of operation of changing the gazing point of the cubic object OB1 or the cylindrical object OB2, even when a user selects the thumbnail images IM for nomination of slide show. That enhances the usability of the cubic object OB1 or the cylindrical object OB2.

In addition, the three-dimensional multimedia browser can switch its display format from a three-dimensional figure, such as the cubic object OB1 or the cylindrical object OB2, to a two-dimensional figure, such as the list screen IG. Therefore, in response to the presentation manner to users, the three-dimensional multimedia browser can switch the manner of displaying the thumbnail images IM between three-dimensional way using the cubic object OB1 or the cylindrical object OB2 and two-dimensional way using the list screen IG.

Furthermore, the three-dimensional multimedia browser can move the thumbnail images IM, which were selected from the surfaces of the cubic object OB1 or the cylindrical object OB2, to the slide show list SL1 or SL2 to display them side-by-side in two-dimensional manner. The three-dimensional multimedia browser also can move the thumbnail images IM back to their initial layout positions on the surfaces of the cubic object OB1 or cylindrical object OB2. Therefore, in response to the presentation manner to users, the three-dimensional multimedia browser can switch the manner of displaying the thumbnail images IM between three-dimensional way using the cubic object OB1 or the cylindrical object OB2 and two-dimensional way using the slide show list SL1 or SL2.

Since the three-dimensional multimedia browser has the above configuration, the three-dimensional multimedia browser can display the plurality of thumbnail images (which represent the multimedia files) in a visually easy-to-see and intuitively easy-to-understand manner through the cubic object OB1 or cylindrical object OB2 corresponding to the presentation manner to users.

(6) Other Embodiments

Figure 26:
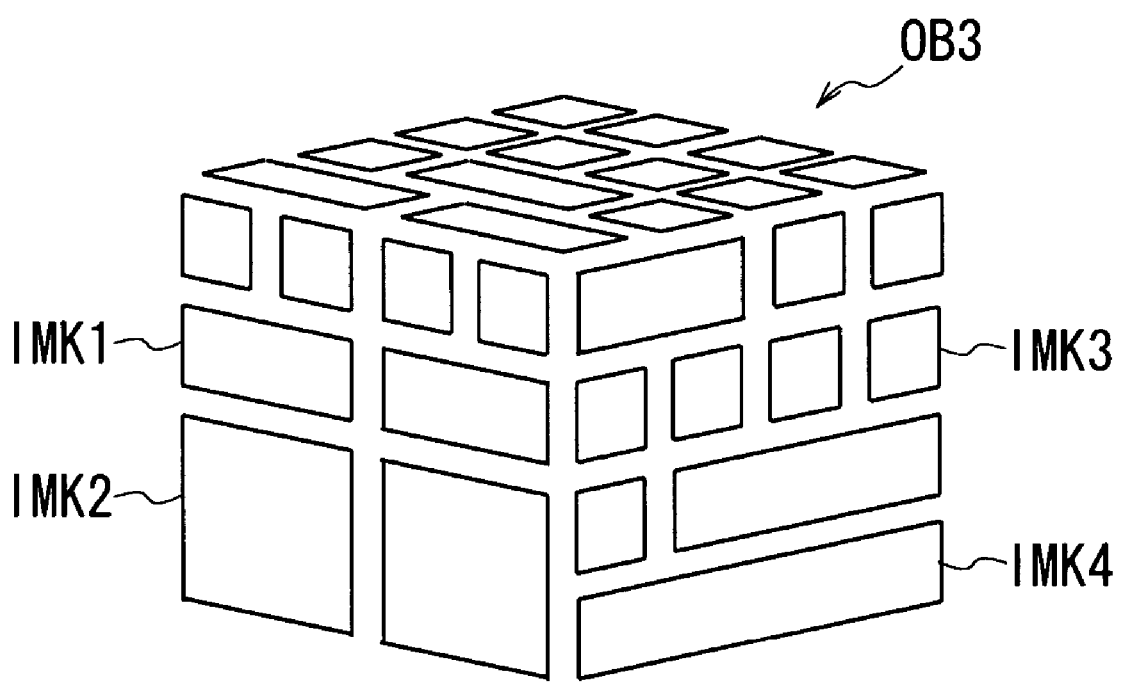
FIG. 26 is a schematic perspective view showing a cubic object according to another embodiment of the present invention.

In the above-noted embodiments, the three-dimensional multimedia browser generates the cubic object OB1 (FIG. 5) by laying out the sixteen thumbnail images IM, which all are the same size, to the sixteen rectangular-shaped layout areas CP1, which are allocated to the surfaces of the virtual polyhedron KT1 (FIG. 3). However, the present invention is not limited to this. The thumbnail images laid out can be different sizes like thumbnail images IMK1 to IMK4 shown in FIG. 26 to make up the cubic object OB3.

Figure 27:
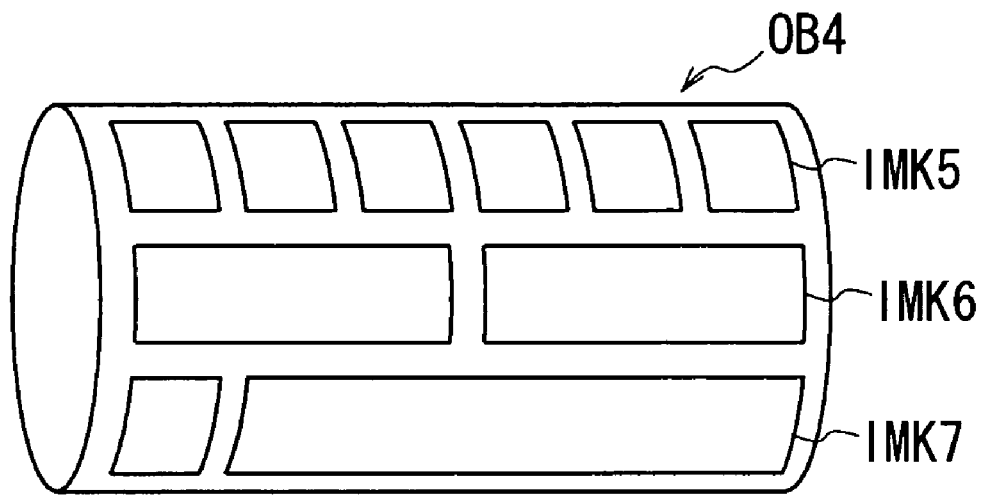
FIG. 27 is a schematic perspective view showing a cylindrical object according to another embodiment of the present invention (1)
Figure 28:
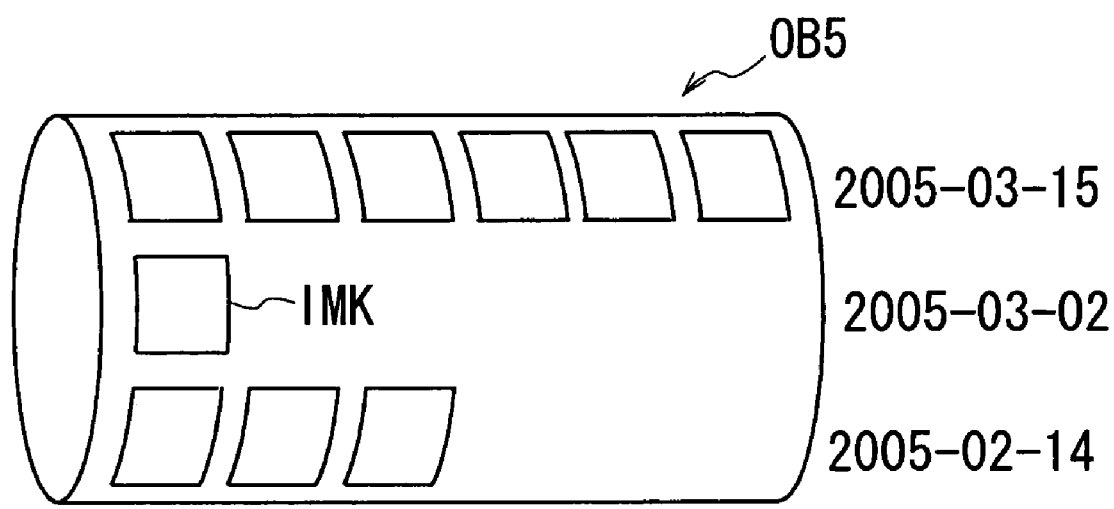
FIG. 28 is a schematic perspective view showing a cylindrical object according to another embodiment of the present invention (2)

In addition, in the above-noted embodiments, the three-dimensional multimedia browser generates the cylindrical object OB2 (FIG. 6) by laying out the six thumbnail images IM, which all are the same size, to the six rectangular-shaped layout areas CP2, which are allocated to the surfaces of the virtual polygonal column KT2 (FIG. 4). However, the present invention is not limited to this. The thumbnail images laid out can be different sizes like thumbnail images IMK5 to IMK7 shown in FIG. 27 to make up the cylindrical object OB4. When there are not six thumbnail images IM of a certain shooting date, the three-dimensional multimedia browser may generate the cylindrical object OB5 by laying out only existing thumbnail images IMK, as shown in FIG. 28.

Figure 29:
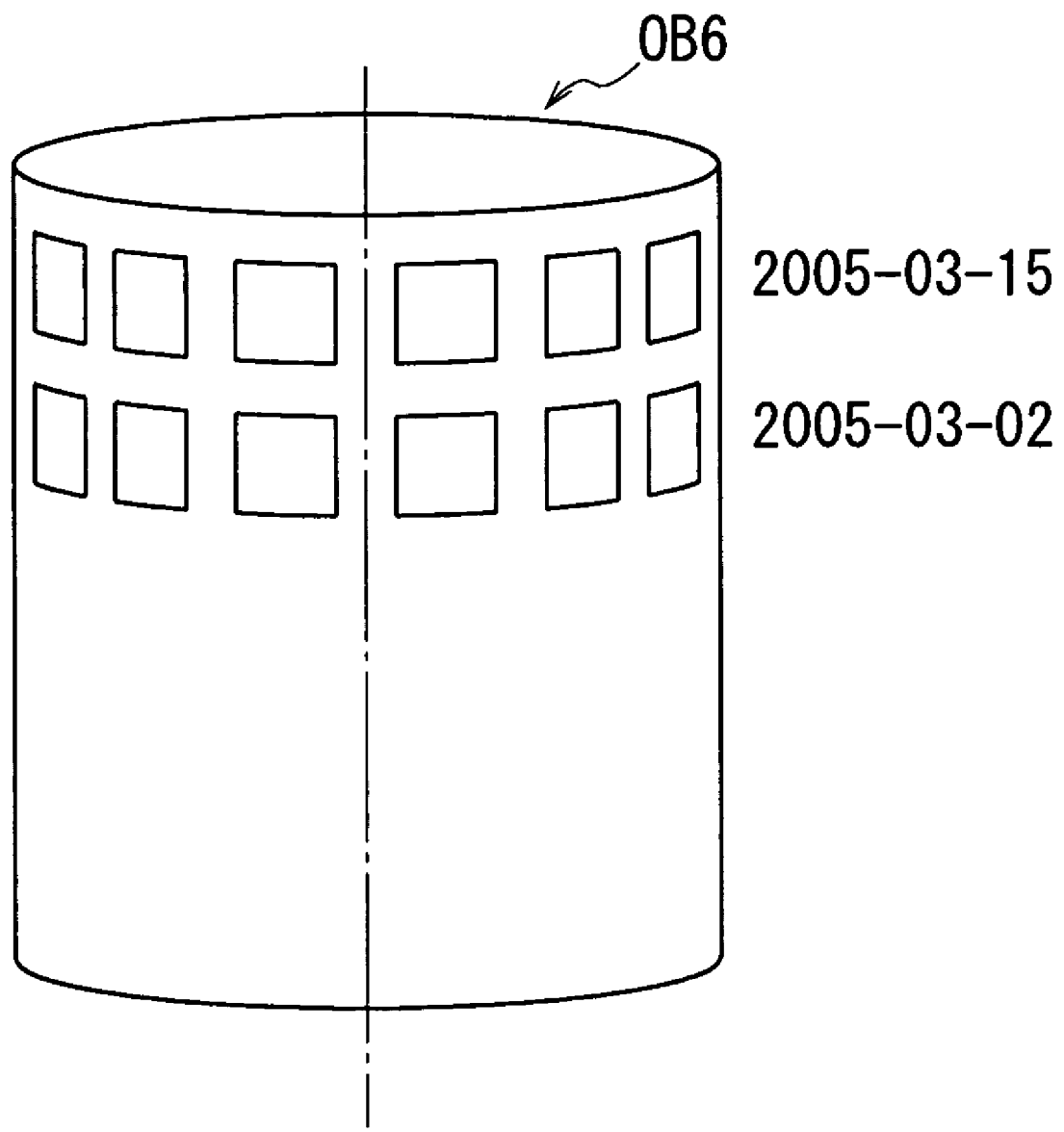
FIG. 29 is a schematic perspective view showing a cylindrical object according to another embodiment of the present invention (3).

Furthermore, in the above-noted embodiments, the three-dimensional multimedia browser generates the cylindrical object OB2 (FIG. 6), by making the longitudinal direction of the virtual polygonal column KT2 (FIG. 4) represent an order of shooting time, and associating each surface of the virtual polygonal column KT2 with a corresponding shooting date. However, the present invention is not limited to this. As shown in FIG. 29, the three-dimensional multimedia browser may generate the cylindrical object OB6, by making a direction perpendicular to the longitudinal direction of the virtual polygonal column KT2 represent an order of shooting time, and then associating each surface with a corresponding shooting date.

Furthermore, in the above-noted embodiments, the thumbnail image IM is a image data. However, the present invention is not limited to this. Various kinds of images, such as icon, mark, symbol and character, can be the image data to represent the multimedia files.

Furthermore, in the above-noted embodiments, the three-dimensional multimedia browser utilizes the cubic object OB1 and the cylindrical object OB2 having sixteen surfaces. However, the present invention is not limited to this. The three-dimensional multimedia browser may utilize other kinds of three-dimensional figures such as polyhedrons and cylinders, including an object formed into a rectangular parallelepiped or a circular cylinder with thirty two surfaces.

Furthermore, in the above-noted embodiments, the CPU 2 of the personal computer 1 executes the three-dimensional object display program to run the three-dimensional multimedia browser including the virtual space generation section 12 (equivalent to three-dimensional object generation means) and the display content determination section 13 (equivalent to selection operation means and control means). However, the present invention is not limited to this. A three-dimensional object display apparatus may include other kinds of hardware components (circuits) equivalent to the three-dimensional object generation means, the selection operation means and the control means.

Furthermore, the CPU 2 of the personal computer 1 executes the three-dimensional object display program to run the three-dimensional multimedia browser. However, the present invention is not limited to this. To run the above three-dimensional multimedia browser, the CPU 2 of the personal computer 1 may execute the program installed from various kinds of storage media (such as Compact Disc Read Only Memory (CD-ROM), Digital Versatile Disc Read Only Memory (DVD-ROM), and semiconductor memory) containing the three-dimensional object display program.

The three-dimensional object display apparatus, three-dimensional object switching display method, three-dimensional object display program and graphical user interface according to an embodiment of the present invention for example can be applied to various kinds of electric devices having a display, such as Personal Digital Assistants (PDAs) and cell phones.

It should be understood by those skilled in the art that various modifications, combinations, sub-combinations and alterations may occur depending on design requirements and other factors insofar as they are within the scope of the appended claims or the equivalents thereof.

What is claimed is:

1. A three-dimensional object display apparatus, comprising:

three-dimensional object generation means for generating a three-dimensional object by laying out a plurality of image data to surfaces of a solid, said three-dimensional object being made in a three-dimensional shape to be displayed on a display section;

selection operation means for selecting an attribute of said plurality of image data; and control means for sorting said plurality of image data into a plurality of categories based on said attribute, for switching, in response to said attribute selected, the three-dimensional shape of said three-dimensional object, for determining a number of the plurality of categories, for determining a number of said surfaces of the solid based on the number of the plurality of categories, and for attaching said plurality of image data to said surfaces of the solid based on the plurality of categories.

2. The three-dimensional object display apparatus according to claim 1, wherein when said attribute is a category, said control means controls said three-dimensional object generation means to switch the three-dimensional shape of said three-dimensional object to a cubic shape, classify said surfaces of said cubic-shaped three-dimensional object according to each of the plurality of categories, and then attach said plurality of image data to said surfaces such that the plurality of categories of said plurality of image data correspond to said surfaces.

3. The three-dimensional object display apparatus according to claim 1, wherein when said attribute is a time, said control means controls said three-dimensional object generation means to switch the three-dimensional shape of said three-dimensional object to a cylindrical shape, sort side surfaces of said cylindrical-shaped three-dimensional object in a first order of time, sort said plurality of image data in a second order of time, and then attach said plurality of image data to said side surfaces, sorted in the first order of time and the second order of time.

4. The three-dimensional object display apparatus according to claim 1, wherein when one of said plurality of image data is selected, said control means sequentially takes said one of said plurality of image data from one of said surfaces, and then displays a slide show list showing said one of said plurality of image data in a two-dimensional manner to perform a slide show.

5. The three-dimensional object display apparatus according to claim 1, wherein said three-dimensional object generation means lays out said plurality of image data to said surfaces of said three-dimensional object such that open spaces are created between said plurality of image data to make one of said plurality of image data on an opposite one of said surfaces visible through one of said open spaces.

6. The three-dimensional object display apparatus according to claim 1, wherein one of said plurality of image data is a still image or an icon.

7. The three-dimensional object display apparatus according to claim 1, wherein said control means determines the number of said surfaces of the solid to be equal to the number of the plurality of categories.

8. The three-dimensional object display apparatus according to claim 3, wherein the first order of time is a date order and the second order of time is a clock time order.

9. A three-dimensional object switching display method, comprising:
  generating a three-dimensional object by laying out a plurality of image data to surfaces of a solid, said three-dimensional object being made in a three-dimensional shape to be displayed on a display section;
  selecting an attribute of said plurality of image data;
  sorting said plurality of image data into a plurality of categories based on said attribute;
  determining a number of the plurality of categories;
  determining, with a processor, a number of said surfaces of the solid based on the number of the plurality of categories;
  attaching said plurality of image data to said surfaces of the solid based on the plurality of categories; and
  switching, in response to said selecting the attribute, the three-dimensional shape of said three-dimensional object.

10. A computer-readable medium encoded with a three-dimensional object display program, wherein the three-dimensional object display program, when executed by an information processing apparatus, causes the information processing apparatus to execute a method comprising:
  generating a three-dimensional object by laying out a plurality of image data to surfaces of a solid, said three-dimensional object being made in a three-dimensional shape
  selecting an attribute of said plurality of image data;
  sorting said plurality of image data into a plurality of categories based on said attribute;
  determining a number of the plurality of categories;
  determining, with the information processing apparatus, a number of said surfaces of the solid based on the number of the plurality of categories;
  attaching said plurality of image data to said surfaces of the solid based on the plurality of categories; and
  switching, in response to said selecting the attribute, the three-dimensional shape of said three-dimensional object.

11. A computer-readable medium including computer-executable instructions, wherein the instructions, when executed by a processor, cause the processor to perform a method for displaying a graphical user interface for displaying a three-dimensional object made in a three-dimensional shape, said graphical user interface switching the three-dimensional shape of said three-dimensional object when the processor switches the three-dimensional shape, said method comprising:
  displaying on a display section said three-dimensional object generated by laying out a plurality of image data to surfaces of a solid;
  selecting an attribute of said plurality of image data;
  sorting said plurality of image data into a plurality of categories based on said attribute;
  determining a number of the plurality of categories;
  determining, with the processor, a number of said surfaces of the solid based on the number of the plurality of categories;
  attaching said plurality of image data to said surfaces of the solid based on the plurality of categories; and
  switching, in response to said selecting the attribute, the three-dimensional shape of said three-dimensional object.

12. A three-dimensional object display apparatus, comprising:
  a three-dimensional object generation section configured to generate a three-dimensional object by laying out a plurality of image data to surfaces of a solid, said three-dimensional object being made in a three-dimensional shape to be displayed on a display section;
  a selection operation section configured to select an attribute of said plurality of image data; and
  a control section configured to sort said plurality of image data into a plurality of categories based on said attribute, to switch, in response to said attribute selected, the three-dimensional shape of said three-dimensional object, to determine a number of the plurality of categories, to determine a number of said surfaces of the solid based on the number of the plurality of categories, and to attach said plurality of image data to said surfaces of the solid based on the plurality of categories.

* * * * *